United States Patent
Zhang et al.

(10) Patent No.: US 11,778,226 B2
(45) Date of Patent: Oct. 3, 2023

(54) STORAGE OF MOTION INFORMATION FOR AFFINE MODE

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/237,402

(22) Filed: Apr. 22, 2021

(65) Prior Publication Data

US 2021/0243467 A1    Aug. 5, 2021

Related U.S. Application Data

(63) Continuation of application No. PCT/IB2019/058991, filed on Oct. 22, 2019.

(30) Foreign Application Priority Data

Oct. 22, 2018   (WO) ................ PCT/CN2018/111176

(51) Int. Cl.
*H04N 19/52* (2014.01)
*H04N 19/176* (2014.01)
*H04N 19/184* (2014.01)

(52) U.S. Cl.
CPC ........... *H04N 19/52* (2014.11); *H04N 19/176* (2014.11); *H04N 19/184* (2014.11)

(58) Field of Classification Search
None
See application file for complete search history.

(56) References Cited

U.S. PATENT DOCUMENTS

| 6,643,387 B1 | 11/2003 | Sethuraman et al. |
| 9,877,043 B2 | 1/2018 | He et al. |

(Continued)

FOREIGN PATENT DOCUMENTS

| CN | 106537915 A | 3/2017 |
| CN | 108271023 A | 7/2018 |

(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

(Continued)

*Primary Examiner* — Lindsay J Uhl
(74) *Attorney, Agent, or Firm* — Perkins Coie LLP

(57) ABSTRACT

The present disclosure relates to storage of motion information for affine mode. A video processing method is provided, including: selecting, during a current affine calculation step in a conversion between a current block and a bitstream representation of the current block, one or more parameters of a set of affine model parameters; storing the one or more parameters for the current block; and performing, based on the one or more parameters, the conversion between the current block and the bitstream representation of the current block.

20 Claims, 20 Drawing Sheets

(56) References Cited

U.S. PATENT DOCUMENTS

| | | | |
|---|---|---|---|
| 10,298,950 B2 | 5/2019 | Wang et al. | |
| 10,448,010 B2 | 10/2019 | Chen et al. | |
| 10,560,712 B2 | 2/2020 | Zou et al. | |
| 10,609,367 B2 | 3/2020 | Zhao et al. | |
| 10,701,366 B2 | 6/2020 | Chen et al. | |
| 10,757,417 B2 | 8/2020 | Zhang et al. | |
| 10,778,999 B2 | 9/2020 | Li et al. | |
| 10,841,609 B1 | 11/2020 | Liu et al. | |
| 2005/0265453 A1 | 12/2005 | Saito | |
| 2005/0276323 A1 | 12/2005 | Martemyanov et al. | |
| 2006/0268166 A1 | 11/2006 | Bossen et al. | |
| 2016/0142729 A1 | 5/2016 | Wang et al. | |
| 2017/0332095 A1 | 11/2017 | Zou et al. | |
| 2018/0041769 A1 | 2/2018 | Chuang et al. | |
| 2018/0098063 A1 | 4/2018 | Chen et al. | |
| 2018/0176582 A1 | 6/2018 | Zhao et al. | |
| 2018/0192069 A1* | 7/2018 | Chen | H04N 19/176 |
| 2018/0359483 A1 | 12/2018 | Chen et al. | |
| 2019/0028731 A1 | 1/2019 | Chuang et al. | |
| 2019/0037231 A1 | 1/2019 | Ikai et al. | |
| 2019/0116376 A1 | 4/2019 | Chen et al. | |
| 2019/0230361 A1 | 7/2019 | Zhang et al. | |
| 2019/0327482 A1 | 10/2019 | Lin et al. | |
| 2019/0387250 A1 | 12/2019 | Boyce et al. | |
| 2020/0021840 A1 | 1/2020 | Xu et al. | |
| 2020/0029089 A1 | 1/2020 | Xu et al. | |
| 2020/0036997 A1 | 1/2020 | Li et al. | |
| 2020/0045310 A1 | 2/2020 | Chen et al. | |
| 2020/0077113 A1 | 3/2020 | Huang et al. | |
| 2020/0145688 A1 | 5/2020 | Zou et al. | |
| 2020/0213594 A1 | 7/2020 | Liu et al. | |
| 2020/0213612 A1 | 7/2020 | Liu et al. | |
| 2020/0221120 A1 | 7/2020 | Robert et al. | |
| 2020/0228817 A1* | 7/2020 | Li | H04N 19/44 |
| 2020/0236353 A1 | 7/2020 | Zhang et al. | |
| 2020/0359029 A1 | 11/2020 | Liu et al. | |
| 2020/0382771 A1 | 12/2020 | Liu et al. | |
| 2020/0382795 A1 | 12/2020 | Zhang et al. | |
| 2020/0396453 A1 | 12/2020 | Zhang et al. | |
| 2020/0396465 A1 | 12/2020 | Zhang et al. | |
| 2021/0051339 A1 | 2/2021 | Liu et al. | |
| 2021/0076063 A1 | 3/2021 | Liu et al. | |
| 2021/0168398 A1 | 6/2021 | Ahn | |
| 2021/0195177 A1 | 6/2021 | Zhang et al. | |
| 2021/0203943 A1 | 7/2021 | Lin et al. | |
| 2021/0211646 A1 | 7/2021 | Lee | |
| 2021/0211714 A1 | 7/2021 | Zhang et al. | |
| 2021/0243468 A1 | 8/2021 | Zhang et al. | |

FOREIGN PATENT DOCUMENTS

| | | | | |
|---|---|---|---|---|
| CN | 108432250 A | 8/2018 | | |
| EP | 3422720 A1 | 1/2019 | | |
| KR | 20180059286 A | 6/2018 | | |
| WO | 2002037859 A2 | 5/2002 | | |
| WO | 2011013253 A1 | 2/2011 | | |
| WO | 2017148345 A1 | 9/2017 | | |
| WO | 2017157259 A1 | 9/2017 | | |
| WO | 2017200771 A1 | 11/2017 | | |
| WO | 2018067823 A1 | 4/2018 | | |
| WO | WO-2018061563 A1 * | 4/2018 | ........... | H04N 19/105 |
| WO | 2018126163 A1 | 7/2018 | | |
| WO | WO-2019231362 A1 * | 12/2019 | ........... | H04N 19/105 |

OTHER PUBLICATIONS

Chen et al. "CE4: Affine Merge Enhancement (Test 2.10)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0186, 2018.

Chen et al. "AHG5: Reducing VVC Worst-Case Memory Bandwidth by Restricting Bi-Directional 4x4 Inter Cus/Sub-Blocks," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0104, 2018.

Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.

Chen et al. "CE4: Affine Merge Enhancement (Test 4.2.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.

Gao et al. "CE4-Related: Sub-Block MV Clipping in Affine Prediction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0317, 2018.

Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2018.

Huang et al. "Control-Point Representation and Differential Coding Affine-Motion Compensation," IEEE Transactions on Circuits and Systems for Video Technology, Oct. 2013, 23(10):1651-1660.

H.265/HEVC, https://www.itu.int/rec/T-REC-H.265.

"JEM-7.0: https://jvet.hhi.fraunhofer.de/svn/svn_HMJEMSoftware/tags/ HM-16.6-JEM-7.0."

VTM-2.0.1: https://vcgit.hhi.fraunhofer.de/jvet/VVCSoftware_VTM/tags/VTM-.

Li et al. "AHG5: Reduction of Worst Case Memory Bandwidth," Joint Video Exploration Team (JVET) of ITU-T SG 16 WP 3 and ISO/IEC JTC 1/SC 29/WG 11, 12th Meeting, Macao, CN, Oct. 3-12, 2018, document JVT-L0122, 2018.

Van et al. "CE4-Related: Affine Restrictions for the Worst-Case Bandwidth Reduction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0396, 2018.

Xiu et al. "CE4.2.5: Simplifications on Advanced Temporal Motion Vector Prediction (ATMVP)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0341, 2018.

Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVE-K1024, 2018.

Yang et al. "CE4-Related: Control Point MV Offset for Affine Merge Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0389, 2018.

Zhang et al. "CE4: Affine Prediction with 4x4 Sub-Blocks for Chroma Componets (Test 4.1.16)," Joint Video Exports Team (JVET) of ITU-T SG 16 WP3 and ISO/IEC JTC 1/SC 29/WG 11, 12th Meeting, Macao, CN, Oct. 3-12, 2018, documet JVET-L0265, 2018.

Zhou et al. "CE4-Related: A Clean Up for Affine Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0047, 2018.

International Search Report and Written Opinion from International Patent Application No. PCT/IB2019/058991 dated Jan. 23, 2020 (16 pages).

International Search Report and Written Opinion from International Patent Application No. PCT/IB2019/058993 dated Jan. 23, 2020 (17 pages).

Non-Final Office Action from U.S. Appl. No. 17/237,450 dated Sep. 2, 2021.

Non-Final Office Action from U.S. Appl. No. 17/193,425 dated Aug. 18, 2022.

Non-Final Office Action from U.S. Appl. No. 17/237,450 dated Jun. 9, 2022.

Non-Final Office Action from U.S. Appl. No. 17/193,397 dated Jun. 27, 2022.

ITU-T H.265 "High efficiency video coding" Series H: Audiovisual and Multimedia SYSTEMSInfrastructure of audiovisual services—

(56) References Cited

OTHER PUBLICATIONS

Coding of movingvideo,Telecommunicationstandardization Sectorof ITU, Available at address: https://www.itu.int/rec/T-REC-H.265 (Nov. 2019).

Iwamura et al. "CE4-2.11: MVPlanar Prediction," Joint Video Experts Team (JVET) of ITU-T SG 16 WP 3 and ISO/IEC JTC 1/SC 29/WG 11 11th Meeting, Ljubljana, SI, Jul. 10-18, 20018, document JVET-K0349, 2018.

Zhang et al. "CE4-Related: Interweaved Prediction for Affine Motion Compensation," Joint Video Experts Team (JVET) of ITU-T SG 16 WP 3 and ISO/IEC JTC 1/SC 29/WG 11, 11th Meeting, Ljubljana, SI, Jul. 10-18, 2018. document JVET-K0102, 2018.

Zhang et al. "CE4-Related: History-based Motion Vector Prediction," Joint Video Experts Team (JVET) of ITU-T SG WP 3 and ISO/IEC JTC 1/SC 29/WG 11, 11th Meeting: Ljubljana, SI, Jul. 10-1, 2018, document JVET-K0104, 2018.

Zhang et al. "CE2-Related: An Alternative Storing Method for Affine Inheritance," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0270, 2019.

Zhou et al. "Non-CE4: A Study on the Affine Merge Mode," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0052, 2018.

International Search Report and Written Opinion from International Patent Application No. PCT/IB2019/058027 dated Feb. 10, 2020 (20 pages).

International Search Report and Written Opinion from International Patent Application No. PCT/IB2019/058028 dated Dec. 18, 2019 (15 pages).

Non-Final Office Action from U.S. Appl. No. 17/193,397 dated Aug. 19, 2021.

Final Office Action from U.S. Appl. No. 17/193,397 dated Mar. 9, 2022.

Final Office Action from U.S. Appl. No. 17/237,450 dated Feb. 24, 2022.

Final Office Action from U.S. Appl. No. 17/237,450 dated Oct. 6, 2022.

\* cited by examiner

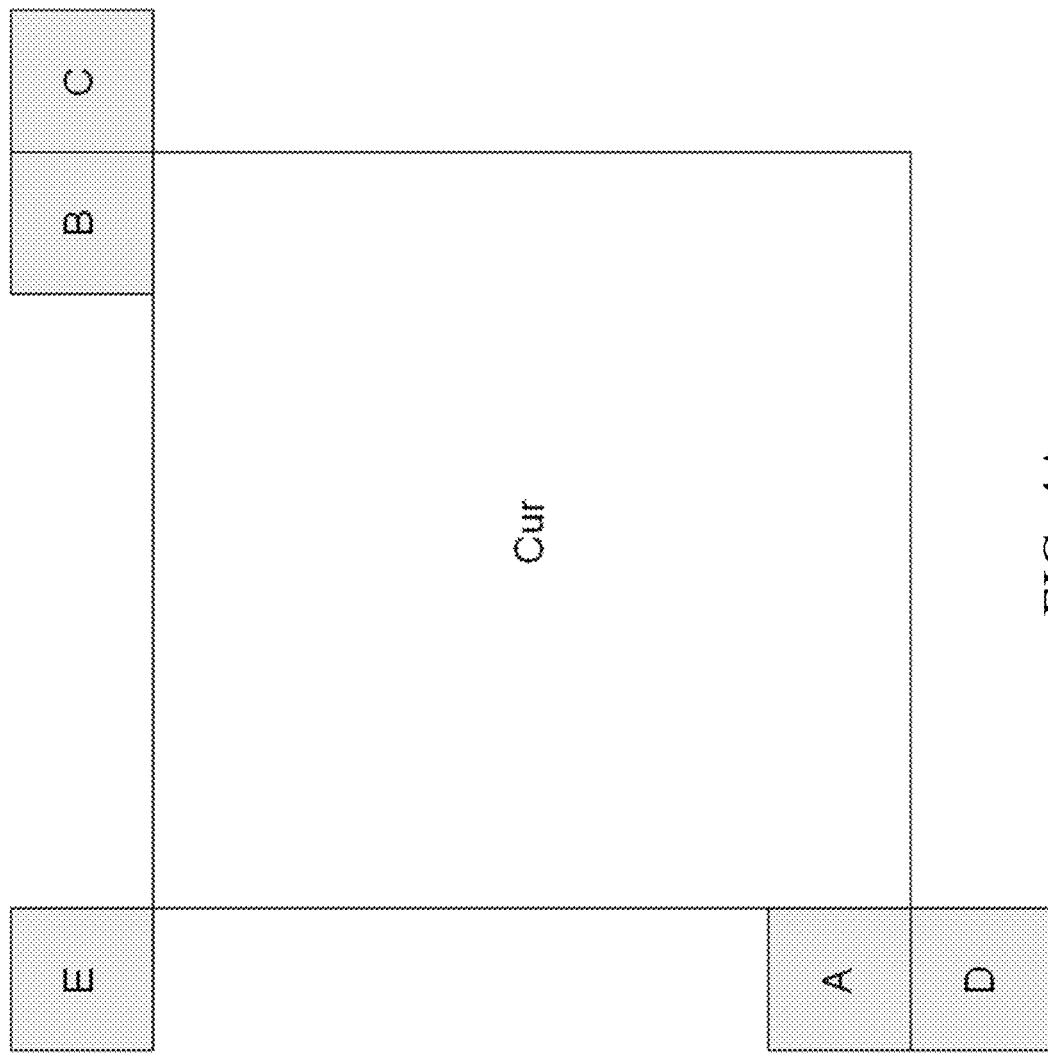

FIG. 11

STORAGE OF MOTION INFORMATION FOR AFFINE MODE

CROSS-REFERENCE TO RELATED APPLICATION

This application is a continuation application of International Application No. PCT/IB2019/058991 filed on Oct. 22, 2019 which timely claim the priority to and benefits of International Patent Application No. PCT/CN2018/111176, filed on Oct. 22, 2018. The entire disclosures of all the aforementioned patent applications are incorporated by reference as part of the disclosure of this application.

TECHNICAL FIELD

This patent document is directed generally to image and video coding technologies.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to the video and image coding and decoding in which motion information for affine mode is stored during video encoding or decoding are described. The described methods may be applied to both the existing video coding standards (e.g., High Efficiency Video Coding (HEVC)) and future video coding standards or video codecs.

In one representative aspect, a video processing method is provided, comprising: selecting, during a current affine calculation step in a conversion between a current block and a bitstream representation of the current block, one or more parameters of a set of affine model parameters; storing the one or more parameters for the current block; and performing, based on the one or more parameters, the conversion between the current block and the bitstream representation of the current block.

In another representative aspect, a video processing method is provided, comprising: acquiring, during a conversion between a current block and a bitstream representation of the current block, motion information of the current block, wherein the motion information of the current block is based on at least one affine model parameter of a neighboring block of the current block; and performing, based on the motion information, the conversion between the current block and the bitstream representation of the current block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 4A and 4B show example candidates for the AF_MERGE affine motion mode.

FIG. 11 shows an example of sixteen 4×4 blocks in a 16×16 region.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Figure 1:
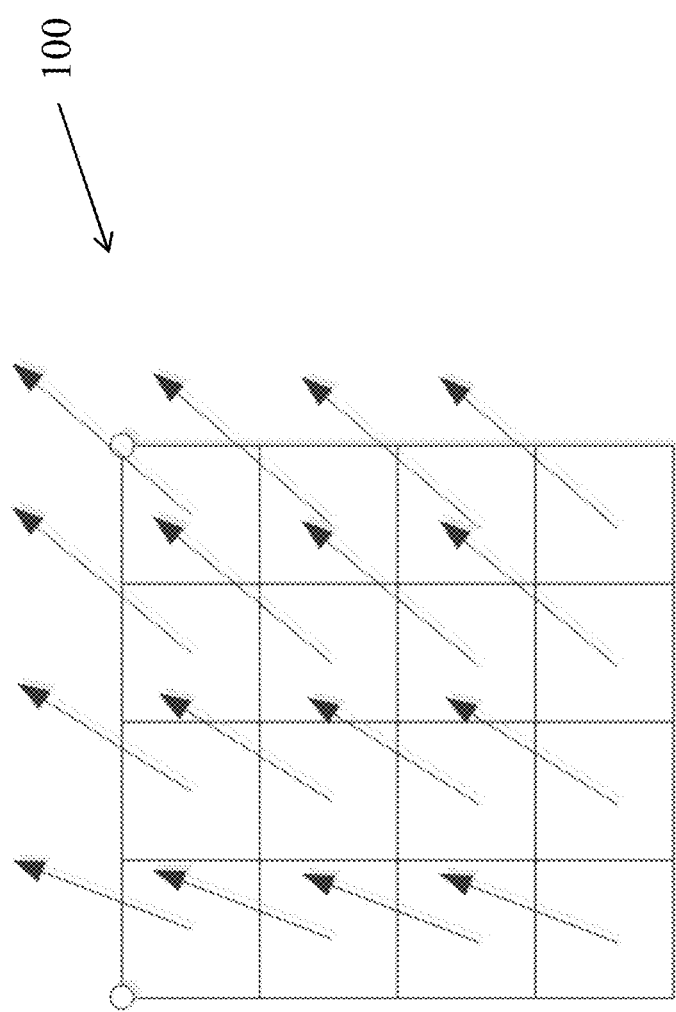
FIG. 1 shows an example of sub-block based prediction.

Sub-block based prediction is first introduced into the video coding standard by the High Efficiency Video Coding (HEVC) standard. With sub-block based prediction, a block, such as a Coding Unit (CU) or a Prediction Unit (PU), is divided into several non-overlapped sub-blocks. Different sub-blocks may be assigned different motion information, such as reference index or motion vector (MV), and motion compensation (MC) is performed individually for each sub-block. FIG. 1 shows an example of sub-block based prediction.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1. Examples of the Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC). Affine prediction has also been adopted into VVC.

1.1 Examples of Affine Prediction

Figure 2A:
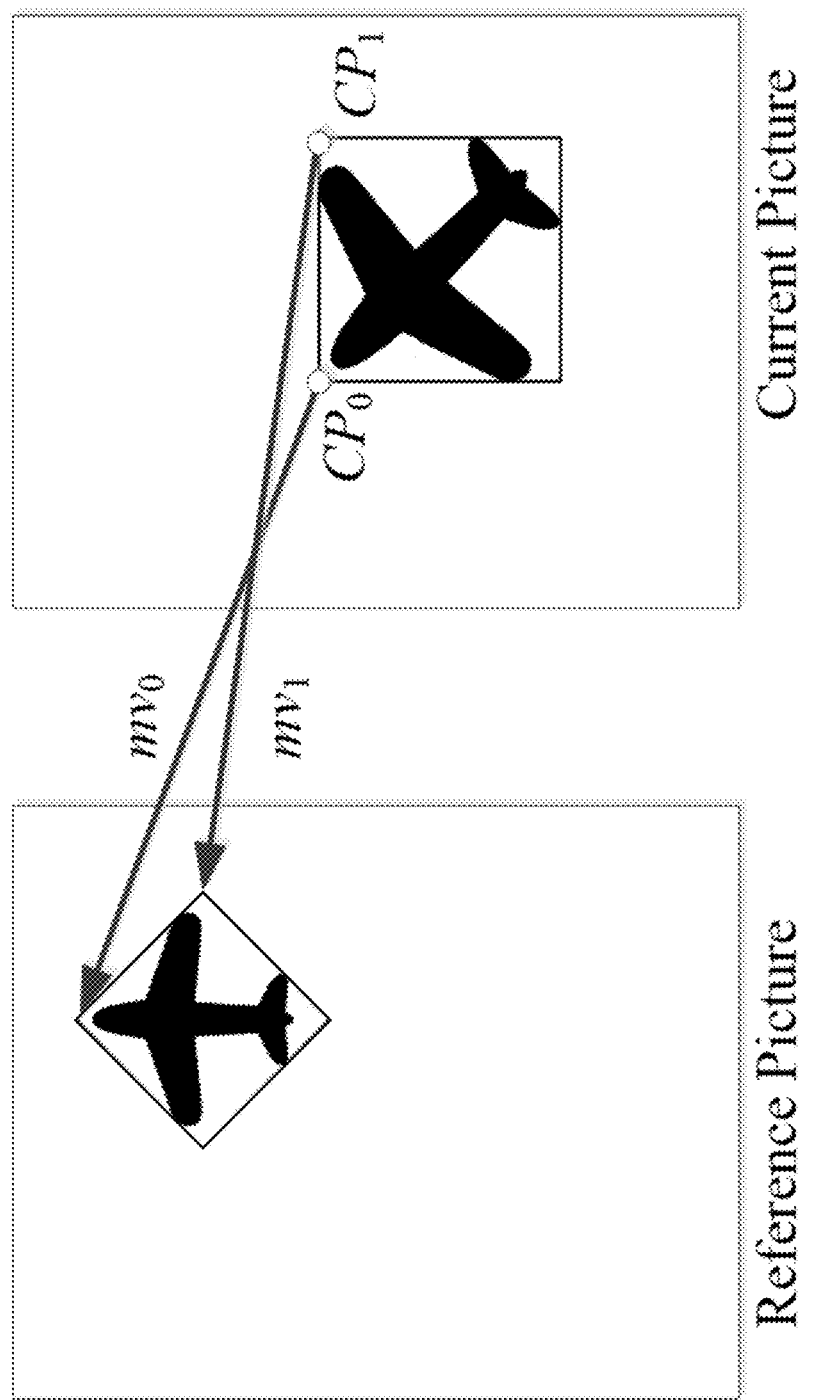
FIGS. 2A and 2B show examples of the simplified 4-parameter affine model and the simplified 6-parameter affine model, respectively.
Figure 2B:
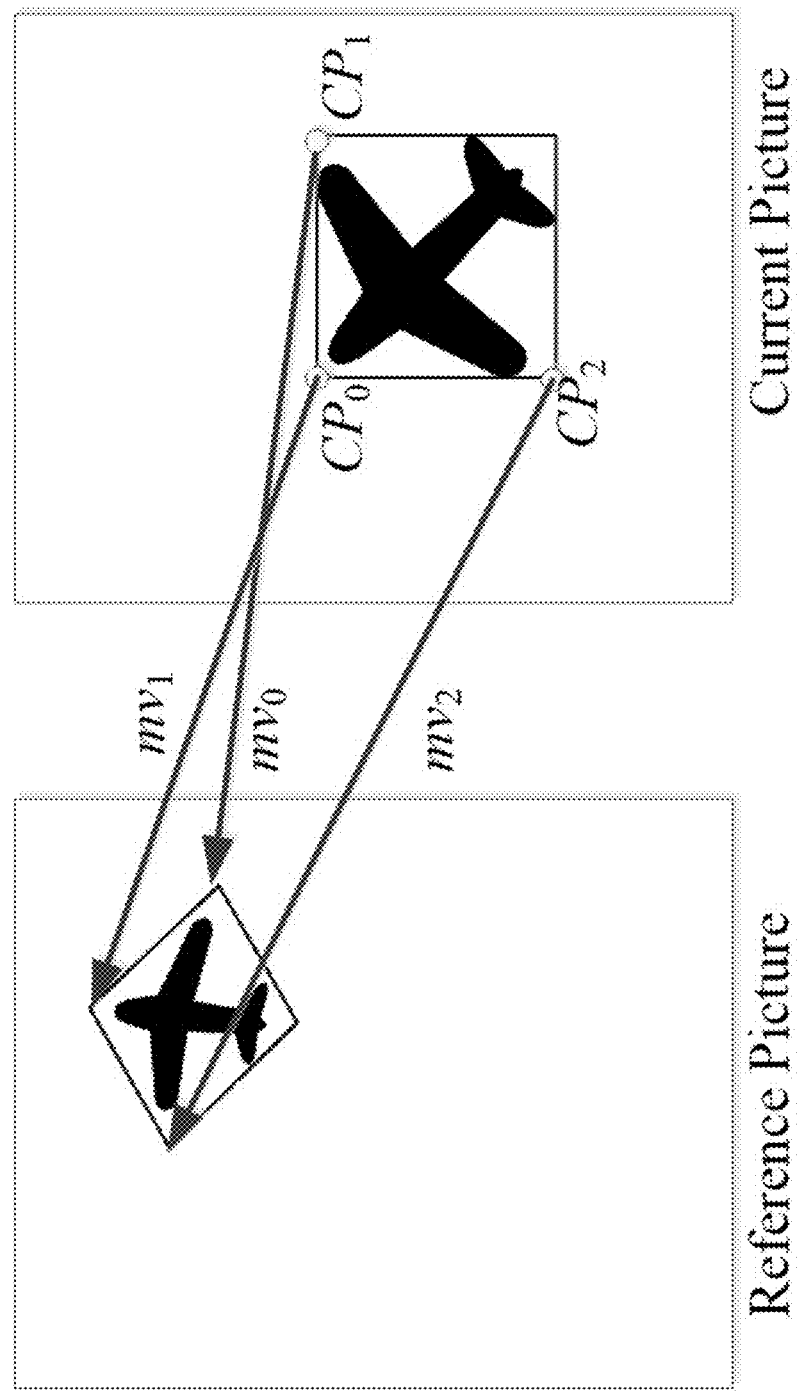

In HEVC, only a translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown in FIGS. 2A and 2B, the affine motion field of the block is described by two (in the 4-parameter affine model that uses the variables a, b, e and f) or three (in the 6-parameter affine model that uses the variables a, b, c, d, e and f) control point motion vectors, respectively.

The motion vector field (MVF) of a block is described by the following equation with the 4-parameter affine model and 6-parameter affine model respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad \text{Eq. (1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{Eq. (2)}$$

Herein, $(mv^h_0, mv^h_0)$ is motion vector of the top-left corner control point (CP), and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In a division-free design, Equations (1) and (2) are implemented as:

$$\begin{cases} iDMvHorX = (mv_1^h - mv_0^h) \ll (S - \log 2(w)) \\ iDMvHorY = (mv_1^v - mv_0^v) \ll (S - \log 2(w)) \end{cases} \quad \text{Eq. (3)}$$

For the 4-parameter affine model shown in Equation (1):

$$\begin{cases} iDMvVerX = iDMvHorY \\ iDMvVerY = iDMvHorX \end{cases} \quad \text{Eq. (4)}$$

For the 6-parameter affine model shown in Equation (2):

$$\begin{cases} iDMvVerX = (mv_2^h - mv_0^h) \ll (S - \log 2(h)) \\ iDMvVerY = (mv_2^v - mv_0^v) \ll (S - \log 2(h)) \end{cases} \quad \text{Eq. (5)}$$

And thus, the motion vectors may be derived as:

$$\begin{cases} mv^h(x, y) = \text{Normalize}(iDMvHorX \cdot x + iDMvVerX \cdot y + (mv_0^h \ll S), S) \\ mv^v(x, y) = \text{Normalize}(iDMvHorY \cdot x + iDMvVerY \cdot y + (mv_0^v \ll S), S) \end{cases} \quad \text{Eq. (6)}$$

$$\text{Normalize}(Z, S) = \begin{cases} (Z + \text{Off}) \gg S & \text{if } Z \leq 0 \\ -((-Z + \text{Off}) \gg S) & \text{Otherwise} \end{cases} \quad \text{Eq. (7)}$$

$$\text{Off} = 1 \ll (S - 1)$$

Herein, S represents the calculation precision. e.g. in VVC, 5=7. In VVC, the MV used in MC for a sub-block with the top-left sample at (xs, ys) is calculated by Equation (6) with x=xs+2 and y=ys+2.

Figure 3:
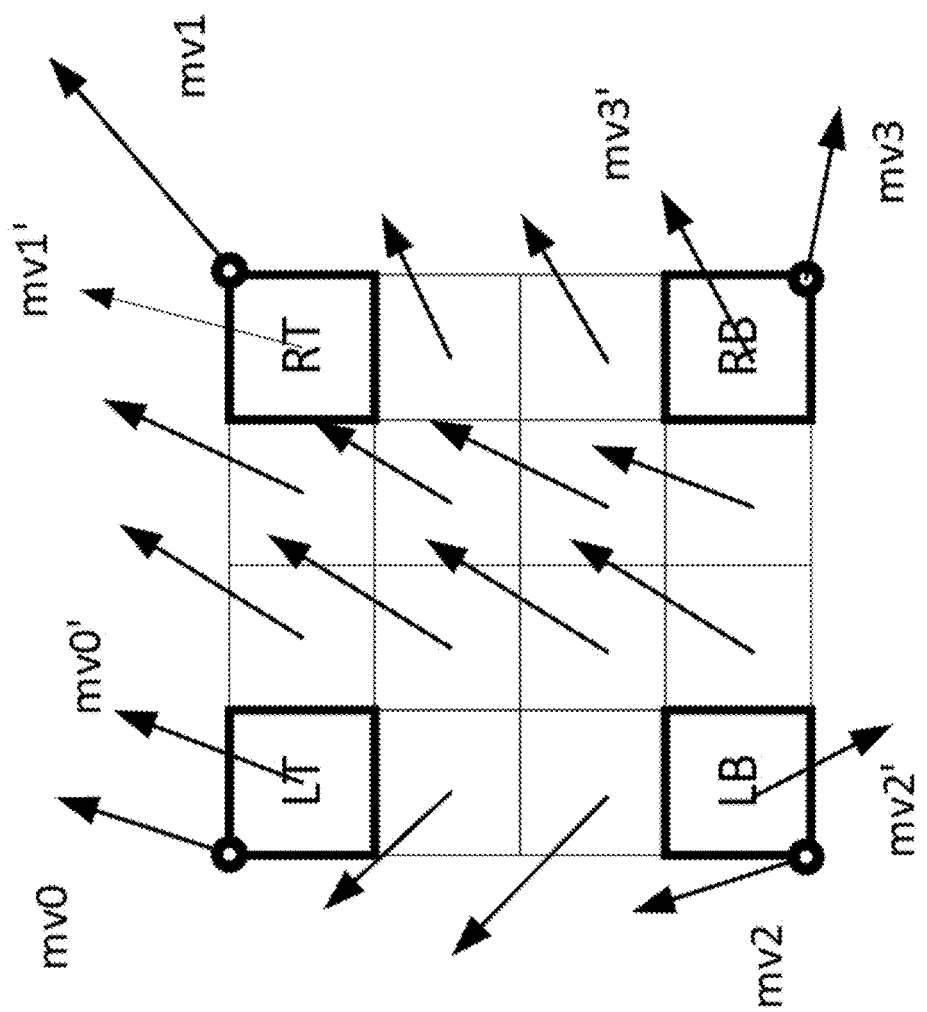
FIG. 3 shows an example of an affine motion vector field (MVF) per sub-block.

To derive motion vector of each 4×4 sub-block, the motion vector of the center sample of each sub-block, as shown in FIG. 3, is calculated according to Equations (1) or (2), and rounded to 1/16 fraction accuracy. Then the motion compensation interpolation filters are applied to generate the prediction of each sub-block with derived motion vector.

Figure 4B:
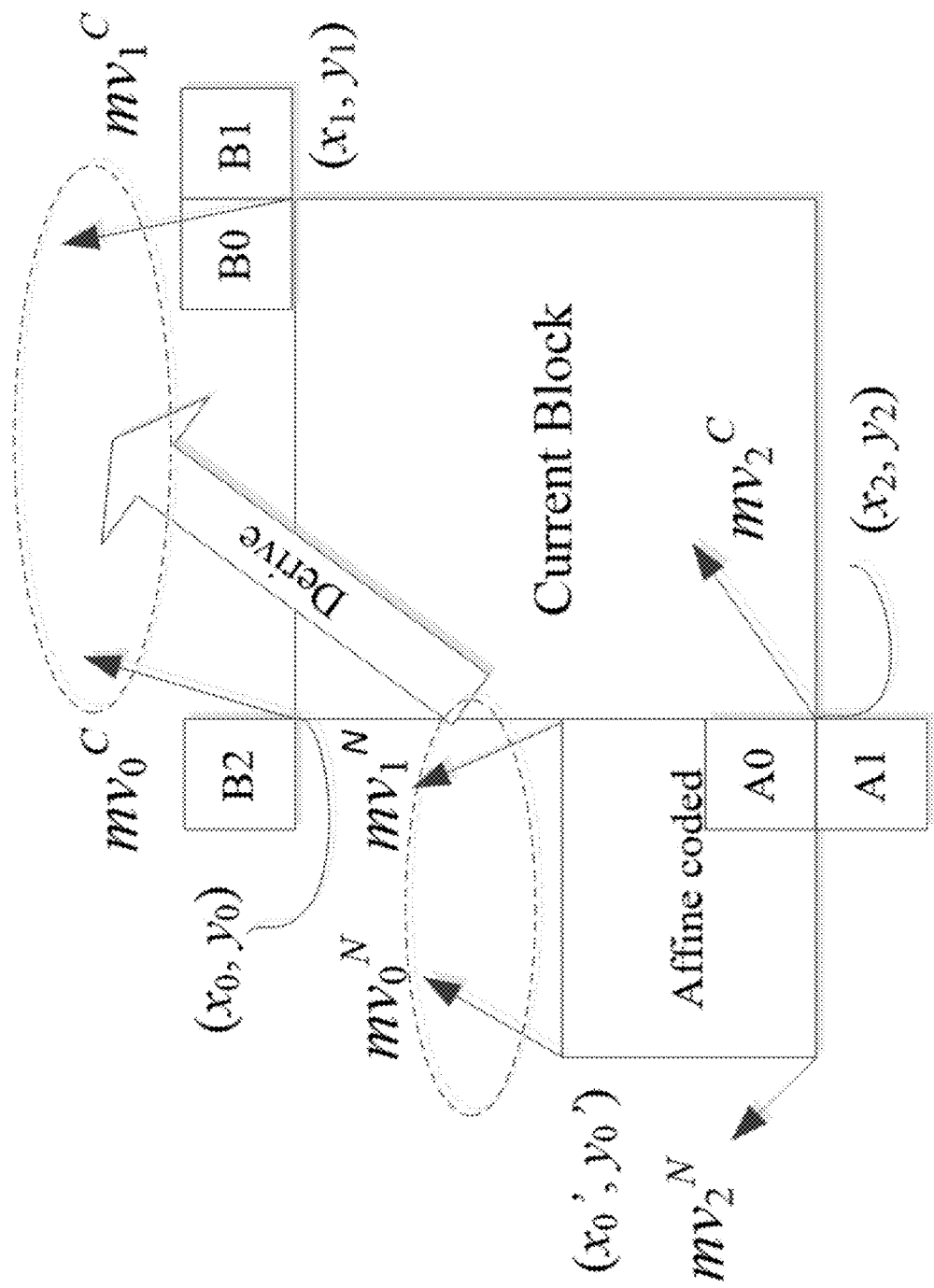

Affine model can be inherited from spatial neighbouring affine-coded block such as left, above, above right, left bottom and above left neighbouring block as shown in FIG. 4A. For example, if the neighbour left bottom block A in FIG. 4A is coded in affine mode as denoted by A0 in FIG. 4B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$.

In some embodiments, sub-block (e.g. 4×4 block in VTM) LT stores mv0, RT stores mv1 if the current block is affine coded. If the current block is coded with the 6-parameter affine model, LB stores mv2; otherwise (with the 4-parameter affine model), LB stores mv2'. Other sub-blocks stores the MVs used for MC.

In some embodiments, when a CU is coded with affine merge mode, e.g., in AF_MERGE mode, it gets the first block coded with affine mode from the valid neighbour reconstructed blocks. And the selection order for the candidate block is from left, above, above right, left bottom to above left as shown in FIG. 4A.

The derived CP MVs $mv_0^C$, $mv_1^C$ and $mv_2^C$ of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

2. Exemplary Embodiments of Affine Prediction

Different from VTM wherein only one affine spatial neighboring block may be used to derive affine motion for a block, it proposes to construct a separate list of affine candidates for the AF_MERGE mode.

(1) Insert Inherited Affine Candidates into Candidate List

In an example, inherited affine candidate means that the candidate is derived from the valid neighbor reconstructed block coded with affine mode.

Figure 5:
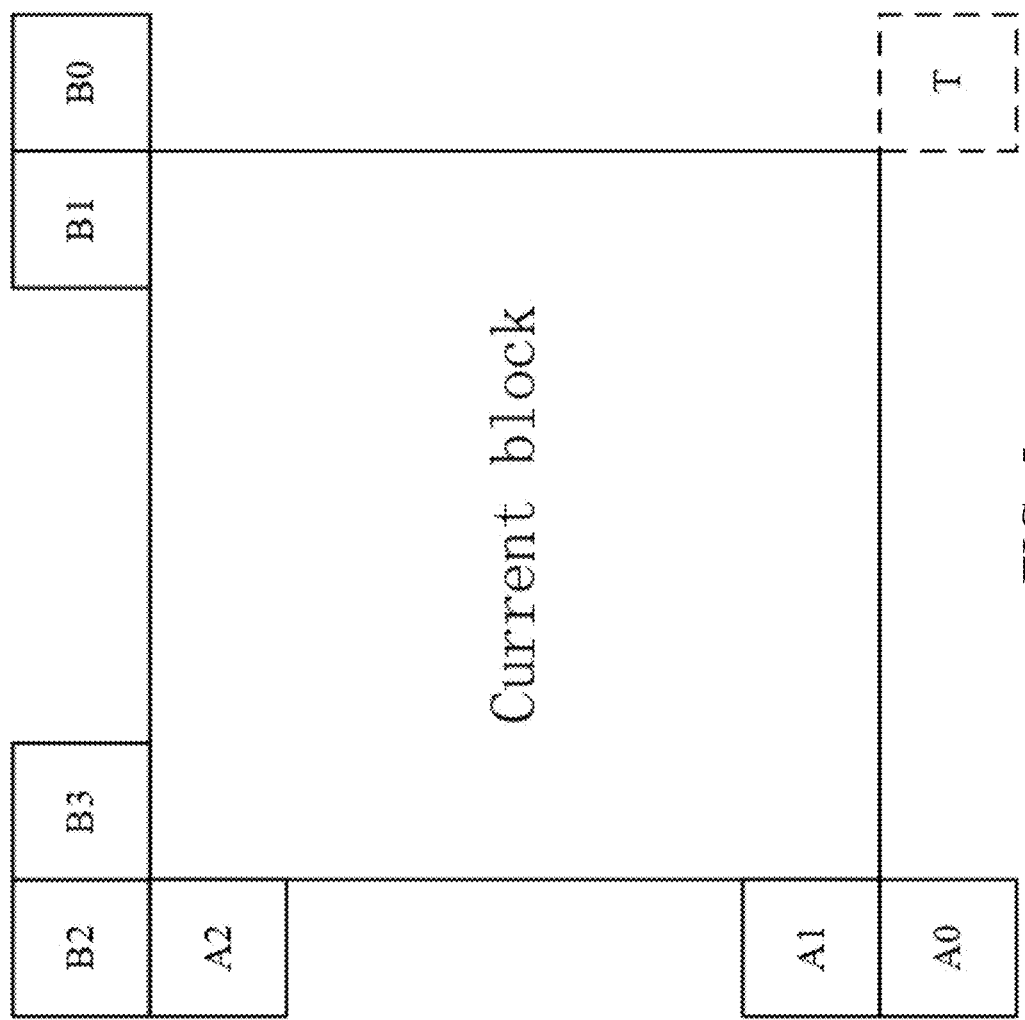
FIG. 5 shows an example of candidate positions for affine merge mode.

As shown in FIG. 5, the scan order for the candidate block is $A_1$, $B_1$, $B_0$, $A_0$ and $B_2$. When a block is selected (e.g., $A_1$), the two-step procedure is applied:

(a) Firstly, use the three corner motion vectors of the CU covering the block to derive two/three control points of current block; and (b) Based on the control points of current block to derive sub-block motion for each sub-block within current block.

(2) Insert Constructed Affine Candidates

In some embodiments, if the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if $B_2$ is unavailable, $B_3$ is used. If both $B_2$ and $B_3$ are unavailable, $A_2$ is used. If all the three candidates are unavailable, the motion information of CP1 cannot be obtained.

For CP2, the checking priority is B1→B0;
For CP3, the checking priority is A1→A0;
For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:
{CP1, CP2, CP3}, {CP1, CP2, CP4}, {CP1, CP3, CP4},
{CP2, CP3, CP4}, {CP1, CP2}, {CP1, CP3}, {CP2, CP3},
{CP1, CP4}, {CP2, CP4}, {CP3, CP4}

(3) Insert Zero Motion Vectors

If the number of candidates in affine merge candidate list is less than MaxNumAffineCand, zero motion vectors are insert into the candidate list, until the list is full.

3. Examples of Advanced Temporal Motion Vector Prediction (ATMVP)

In some existing implementations (e.g., 10th JVET meeting), advanced temporal motion vector prediction (ATMVP) was included in the benchmark set (BMS)-1.0 reference software, which derives multiple motion for sub-blocks of one coding unit (CU) based on the motion information of the collocated blocks from temporal neighboring pictures. Although it improves the efficiency of temporal motion vector prediction, the following complexity issues are identified for the existing ATMVP design:

The collocated pictures of different ATMVP CUs may not be the same if multiple reference pictures are used. This means the motion fields of multiple reference pictures need to be fetched.

The motion information of each ATMVP CU is always derived based on 4×4 units, resulting in multiple invocations of motion derivation and motion compensation for each 4×4 sub-block inside one ATMVP CU.

Some further simplifications on ATMVP can be adopted.

3.1 Examples of Simplified Collocated Block Derivation with One Fixed Collocated Picture In this exemplary method, one simplified design is proposed to use the same collocated picture as in HEVC, which is signaled at the slice header, as the collocated picture for ATMVP derivation. At the block level, if the reference picture of a neighboring block is different from this collocated picture, the MV of the block is scaled using the HEVC temporal MV scaling method, and the scaled MV is used in ATMVP.

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

3.2 Examples of Adaptive ATMVP Sub-Block Size

In this exemplary method, it is proposed to support the slice-level adaptation of the sub-block size for the ATMVP motion derivation. Specifically, one default sub-block size that is used for the ATMVP motion derivation is signaled at sequence level. Additionally, one flag is signaled at slice-level to indicate if the default sub-block size is used for the current slice. If the flag is false, the corresponding ATMVP sub-block size is further signaled in the slice header for the slice.

4. Examples of Spatial-Temporal Motion Vector Prediction (STMVP)

Figure 6:
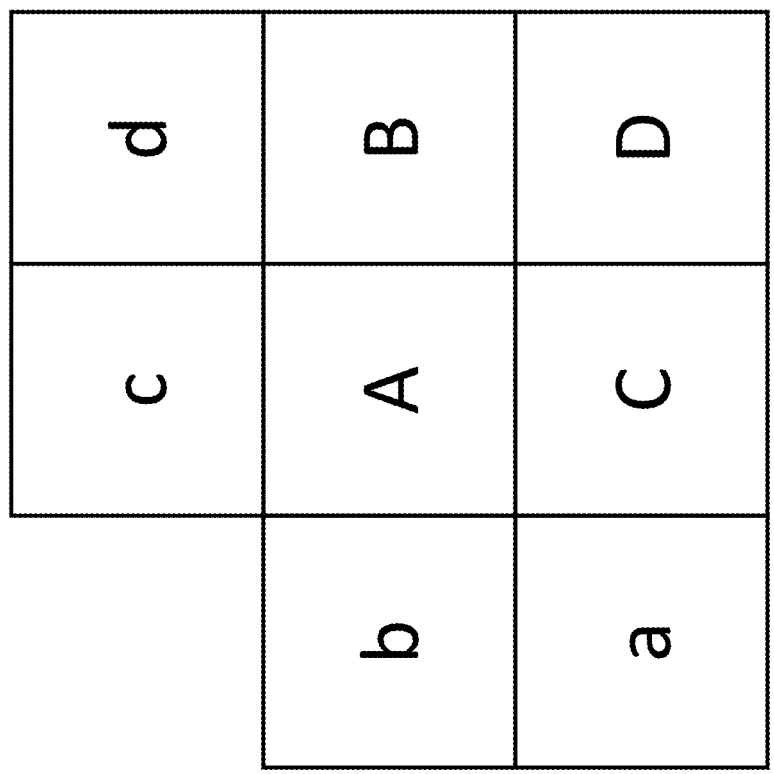
FIG. 6 shows an example of one coding unit (CU) with sub-blocks and neighboring blocks of the CU.

In the STMVP method, the motion vectors of the sub-CUs are derived recursively, following raster scan order. FIG. 6 shows an example of one CU with four sub-blocks and neighboring blocks. Consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

5. Exemplary Embodiments of Affine Merge Candidate Lists 5.1 Embodiments of Affine Merge Candidate Lists In the affine merge mode, only the first available affine neighbour can be used to derive motion information of affine merge mode. A candidate list for affine merge mode is constructed by searching valid affine neighbours and combining the neighbor motion information of each control point.

The affine merge candidate list is constructed as following steps:

(1) Insert Inherited Affine Candidates

Inherited affine candidate means that the candidate is derived from the affine motion model of its valid neighbor affine coded block. In the common base, as shown in FIG. 5, the scan order for the candidate positions is: A1, B1, B0, A0 and B2.

After a candidate is derived, full pruning process is performed to check whether same candidate has been inserted into the list. If a same candidate exists, the derived candidate is discarded.

(2) Insert Constructed Affine Candidates

If the number of candidates in affine merge candidate list is less than MaxNumAffineCand (set to 5 in this example), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if $B_2$ is unavailable, $B_3$ is used. If both $B_2$ and $B_3$ are unavailable, $A_2$ is used. If all the three candidates are unavailable, the motion information of CP1 cannot be obtained.

For CP2, the checking priority is $B1 \rightarrow B0$;

For CP3, the checking priority is $A1 \rightarrow A0$;

For CP4, T is used.

Secondly, the combinations of controls points are used to construct the motion model.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

(3) Padding with Zero Motion Vectors

If the number of candidates in affine merge candidate list is less than 5, zero motion vectors with zero reference indices are insert into the candidate list, until the list is full.

5.2 Embodiments of Affine Merge Mode

Simplifications for the affine merge mode are proposed as follows:

(1) The pruning process for inherited affine candidates is simplified by comparing the coding units covering the neighboring positions, instead of comparing the affine candidates. Up to 2 inherited affine candidates are inserted into affine merge list. The pruning process for constructed affine candidates is totally removed.

(2) The MV scaling operation in constructed affine candidate is removed. If the reference indices of control points are different, the constructed motion model is discarded.

(3) The number of constructed affine candidates is reduced from 10 to 6.

(4) It is also proposed that other merge candidates with sub-block prediction such as ATMVP is also put into the affine merge candidate list. In that case, the affine merge candidate list may be renamed with some other names such as sub-block merge candidate list.

6. Examples of Pairwise Average Candidates

Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replaces the combined candidates in HEVC standard.

7. Examples of Control Point Motion Vector (CPMV) Offset

New Affine merge candidates are generated based on the CPMVs offsets of the first Affine merge candidate. If the first Affine merge candidate enables 4-parameter Affine model, then 2 CPMVs for each new Affine merge candidate are derived by offsetting 2 CPMVs of the first Affine merge candidate; Otherwise (6-parameter Affine model enabled), then 3 CPMVs for each new Affine merge candidate are derived by offsetting 3 CPMVs of the first Affine merge candidate. In Uni-prediction, the CPMV offsets are applied to the CPMVs of the first candidate. In Bi-prediction with List 0 and List 1 on the same direction, the CPMV offsets are applied to the first candidate as follows:

$$MV_{new(L0),i} = MV_{old(L0)} + MV_{offset(i)}$$

$$MV_{new(L1),i} = MV_{old(L1)} + MV_{offset(i)}$$

In Bi-prediction with List 0 and List 1 on the opposite direction, the CPMV offsets are applied to the first candidate as follows:

$$MV_{new(L0),i} = MV_{old(L0)} + MV_{offset(i)}$$

$$MV_{new(L1),i} = MV_{old(L1)} - MV_{offset(i)}$$

In this embodiment, various offset directions with various offset magnitudes are used to generate new Affine merge candidates. Two implementations were tested:

(1) 16 new Affine merge candidates with 8 different offset directions with 2 different offset magnitudes are generated as shown in the following offsets set:

Offset set={(4, 0), (0, 4), (−4, 0), (0, −4), (−4, −4), (4, −4), (4, 4), (−4, 4), (8, 0), (0, 8), (−8, 0), (0, −8), (−8, −8), (8, −8), (8, 8), (−8, 8)}.

The Affine merge list is increased to 20 for this design. The number of potential Affine merge candidates is 31 in total.

(2) 4 new Affine merge candidates with 4 different offset directions with 1 offset magnitude are generated as shown in the following offsets set:

Offset set={(4, 0), (0, 4), (−4, 0), (0, −4)}.

The Affine merge list is kept to 5. Four temporal constructed Affine merge candidates are removed to keep the number of potential Affine merge candidates unchanged, i.e., 15 in total. Suppose the coordinates of CPMV1, CPMV2, CPMV3 and CPMV4 are (0, 0), (W, 0), (H, 0) and (W, H). Note that CPMV4 is derived from the temporal MV as shown in FIG. 5. The removed candidates are the following four temporal-related constructed Affine merge candidates: {CP2, CP3, CP4}, {CP1, CP4}, {CP2, CP4}, {CP3, CP4}.

8. Examples of the Line-Buffer Issue

In the current design of the affine mode, a mixed motion vector field of the affine control point vectors (CPMVs) and sub-block motion vectors is used for the affine motion data inheritance (i.e. for affine merge and affine AMVP list derivation), for the merge/skip and AMVP list derivation (i.e. serve as spatial neighboring candidates), and for storage of temporal motion vectors (TMVPs) for use in future pictures. A separate sub-block motion vector field (computed on-the-fly) is used for the motion compensation of PUs coded in affine mode.

Figure 7A:
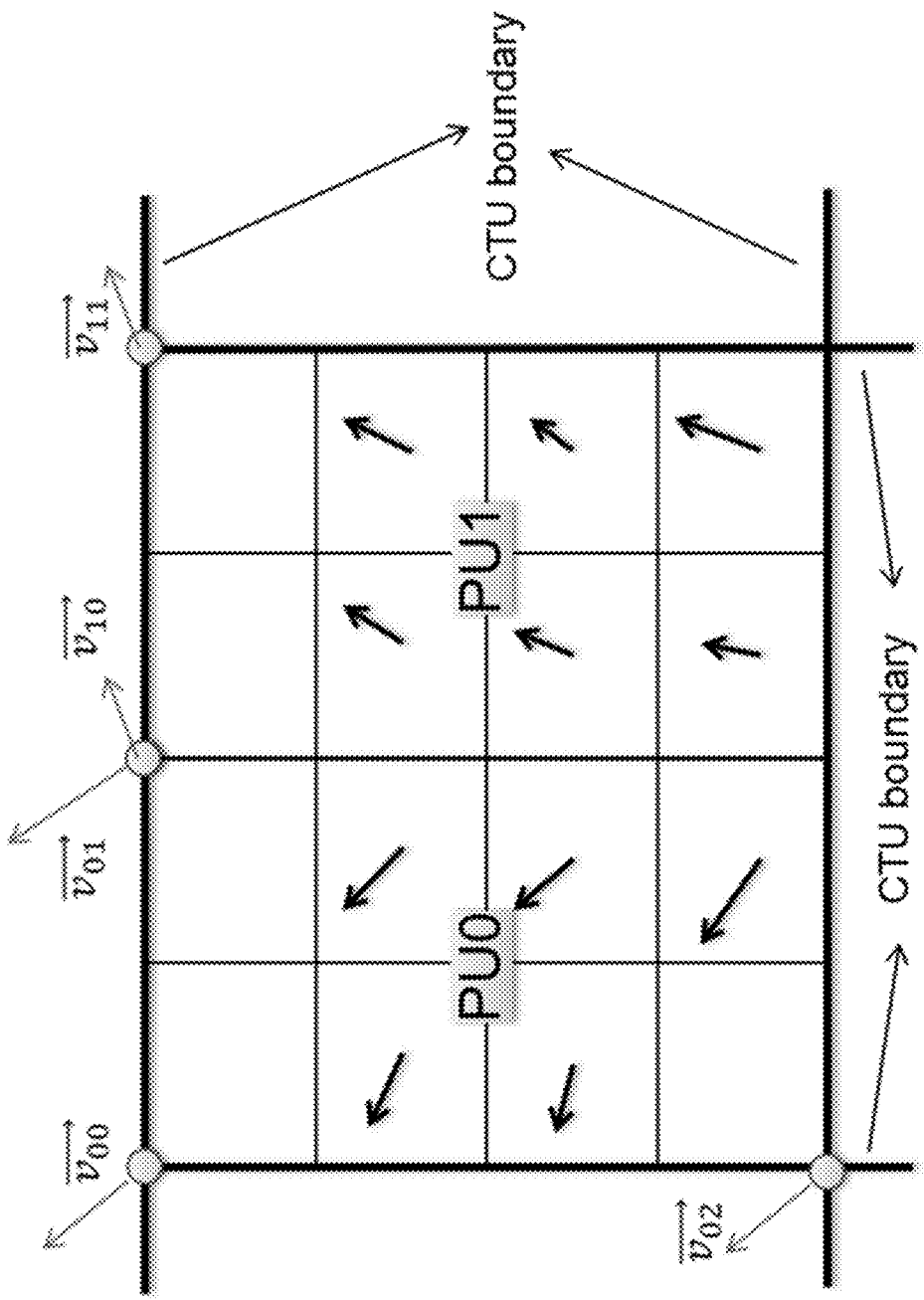
FIGS. 7A and 7B show examples of the motion vector field for merge/skip/AMVP/TMVP affine inheritance and for motion compensation, respectively.
Figure 7B:
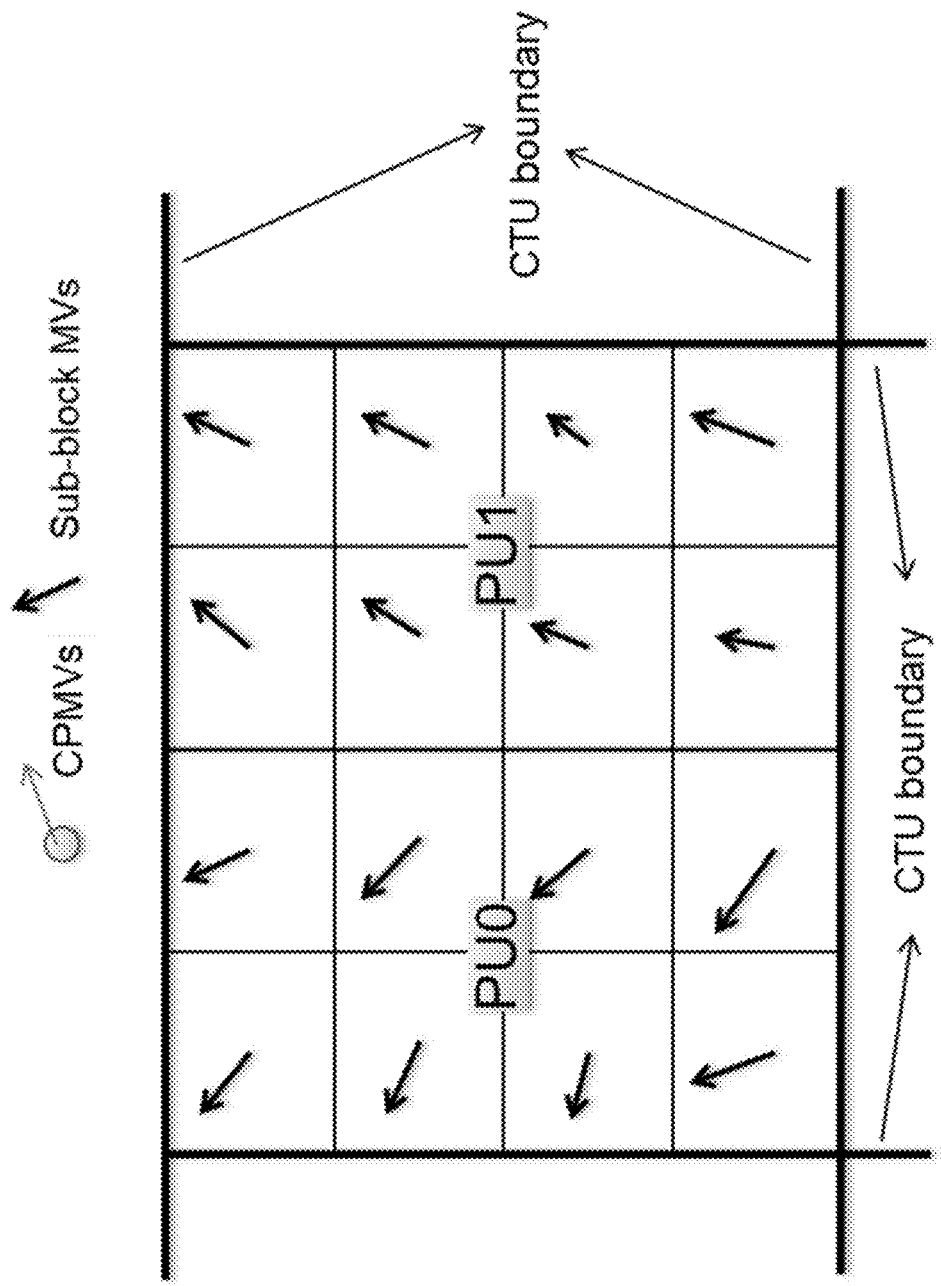

FIGS. 7A and 7B show an example, in which a CTU is partitioned in two PUs, and both of them are coded in affine mode. As shown in FIG. 7A, in the current design the CPMVs are stored in the top-left, top-right and bottom-left (if a PU uses 6-parameter affine motion models) sub-block locations of the sub-block motion vector field (overwriting the computed sub-block vectors for those locations). This creates a mixed set of CPMVs and sub-block motion vectors that is used for the merge/skip/AMVP/TMVPs and affine inheritance. For motion compensation, a separate sub-block motion vector field (shown in FIG. 7B) is generated again as only the sub-block vectors (not control point vectors) are used in the motion compensation of affine mode.

For actual decoder implementations, the sub-block motion vector field (shown in FIG. 8B for example) needs to be generated in advance, and pushed to the motion compensation engine to set up pre-fetch of reference blocks for motion compensation. Before the sub-block motion vector field is consumed by the motion compensation, it cannot be overwritten by e.g. CPMVs.

To minimize the memory buffer size, one possible solution to store the CPMVs and the sub-block vectors separately, in which the CPMVs are stored in one buffer, and the sub-block vectors for the MC are stored in another, so that the sub-block vector field used for the MC won't get overwritten before it is consumed by the MC. For the merge/skip and AMVP list derivation and the storage of the TMVPs, the decoder would need to switch back and forth between those two motion vector buffers to fetch either the CPMVs or sub-block vectors from neighboring PUs as the spatial MV candidates or candidate vectors for TMVP storage. Also, more storage would be needed for the CPMVs, because the non-adjacent CPMVs, which are no longer required by the merge/skip/AMVP list derivation of the current PU, cannot be disposed before they are compressed together with other sub-block motion vectors in the CTU and written out as temporal motion vectors for use in future pictures.

As discussed above, the CPMVs would need to be stored separately anyway in actual implementations for minimizing the memory buffer size, it makes less sense to mix the CPMVs and sub-block vectors in the merge/skip and AMVP list derivation process and in the storage of TMVPs, as doing so won't reduce the memory footprint. It would be more straightforward and consistent to use the sub-block vectors as spatial candidates for merge/skip and AMVP list derivation and for TMVPs, and leave the CPMVs for the use of the affine motion data inheritance only.

Figure 8A:
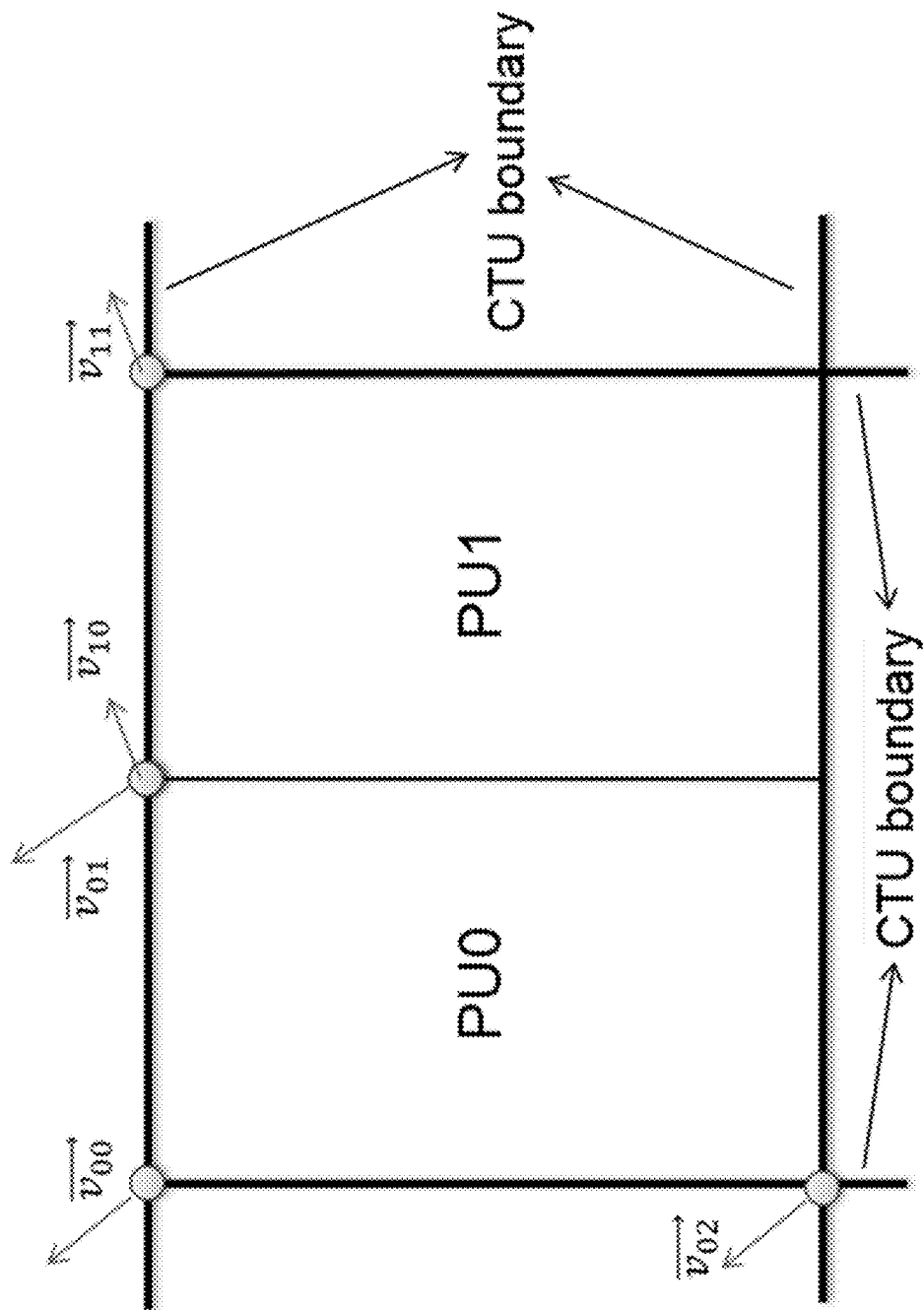
FIGS. 8A and 8B show examples of the motion vector field for affine inheritance and for merge/skip/AMVP/TMVP motion compensation, respectively.
Figure 8B:
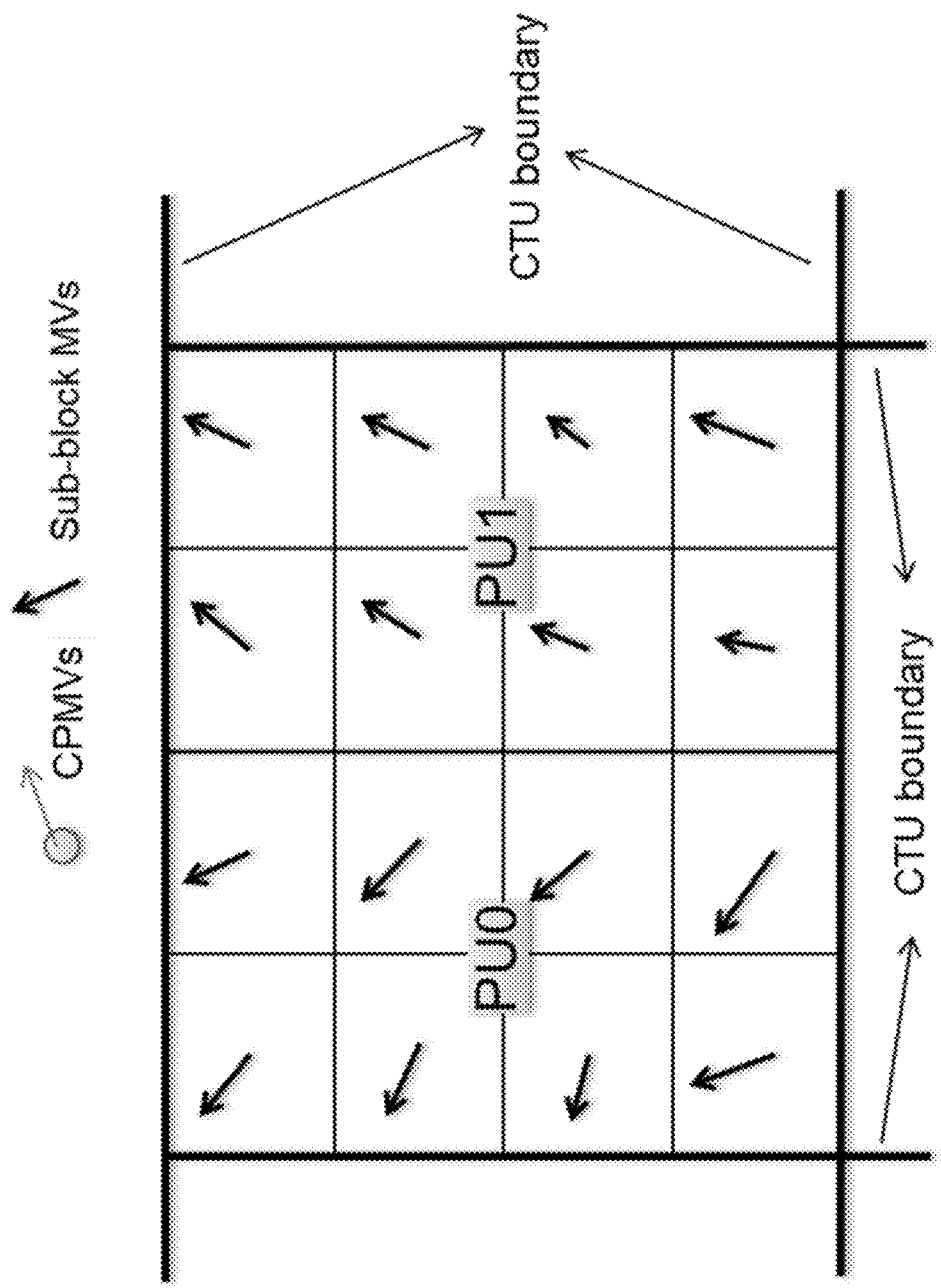

FIGS. 8A and 8B show an example for the proposed clean-up (e.g., clean-up method 1), in which the CPMVs (e.g., FIG. 8A) are stored separately and used for the affine inheritance only. The sub-block vector field (e.g., FIG. 8B) is used not only for the motion compensation, but also for the merge/skip/AMVP list derivation and for the storage of TMVPs.

For 128×128 CTU size, the buffers for storing all CPMVs and 4×4 based sub-block motion vectors inside the CTU are about 6,144 bytes and 8,192 bytes (just counting motion vectors, not other parameters such as PU sizes and reference indices for the sake of explanation), respectively.

Figure 9A:
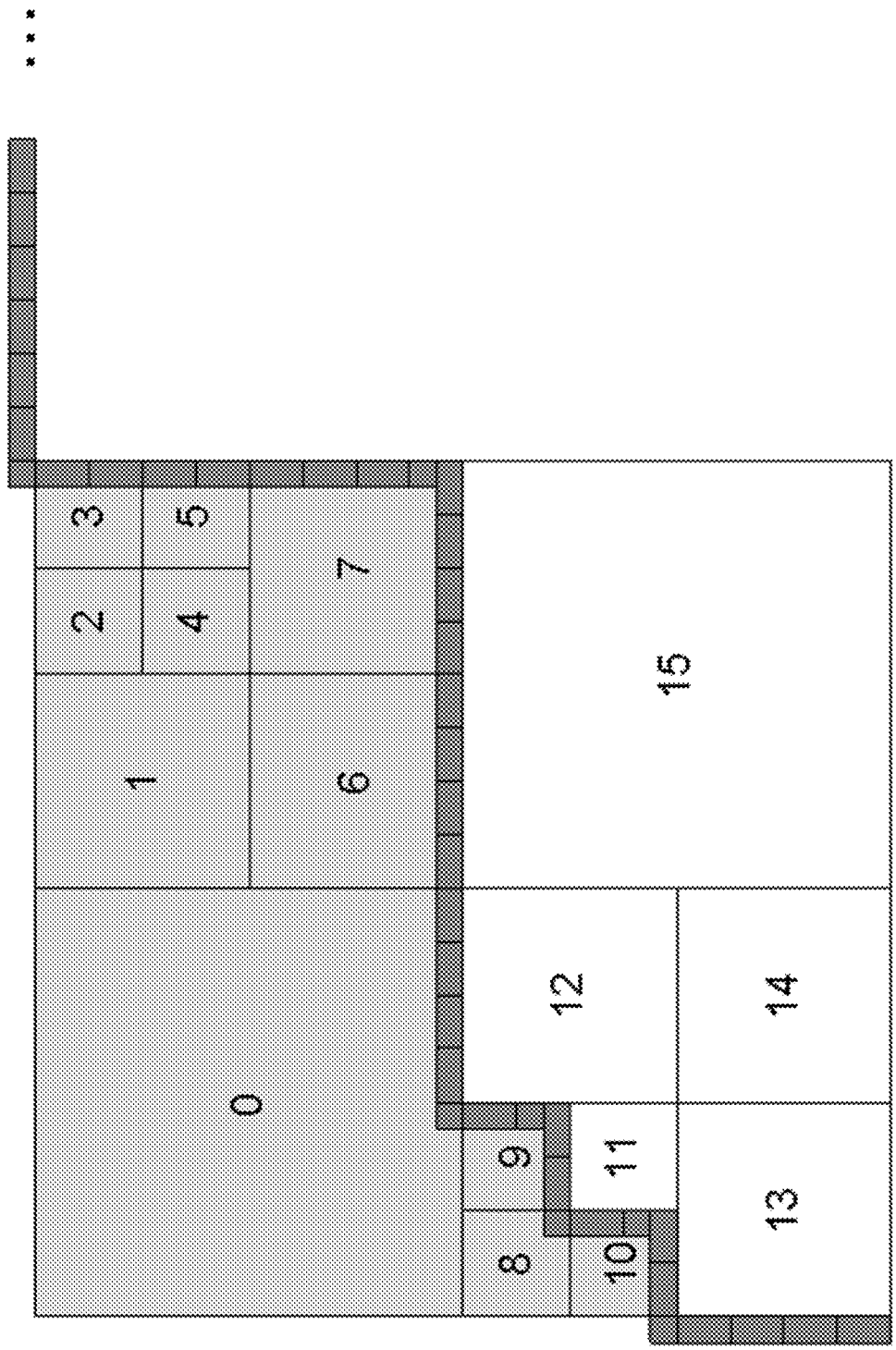
FIGS. 9A and 9B show examples of motion vector context storage for CPMV storage with 8-pixel granularity and MV storage with 4-pixel granularity, respectively.
Figure 9B:
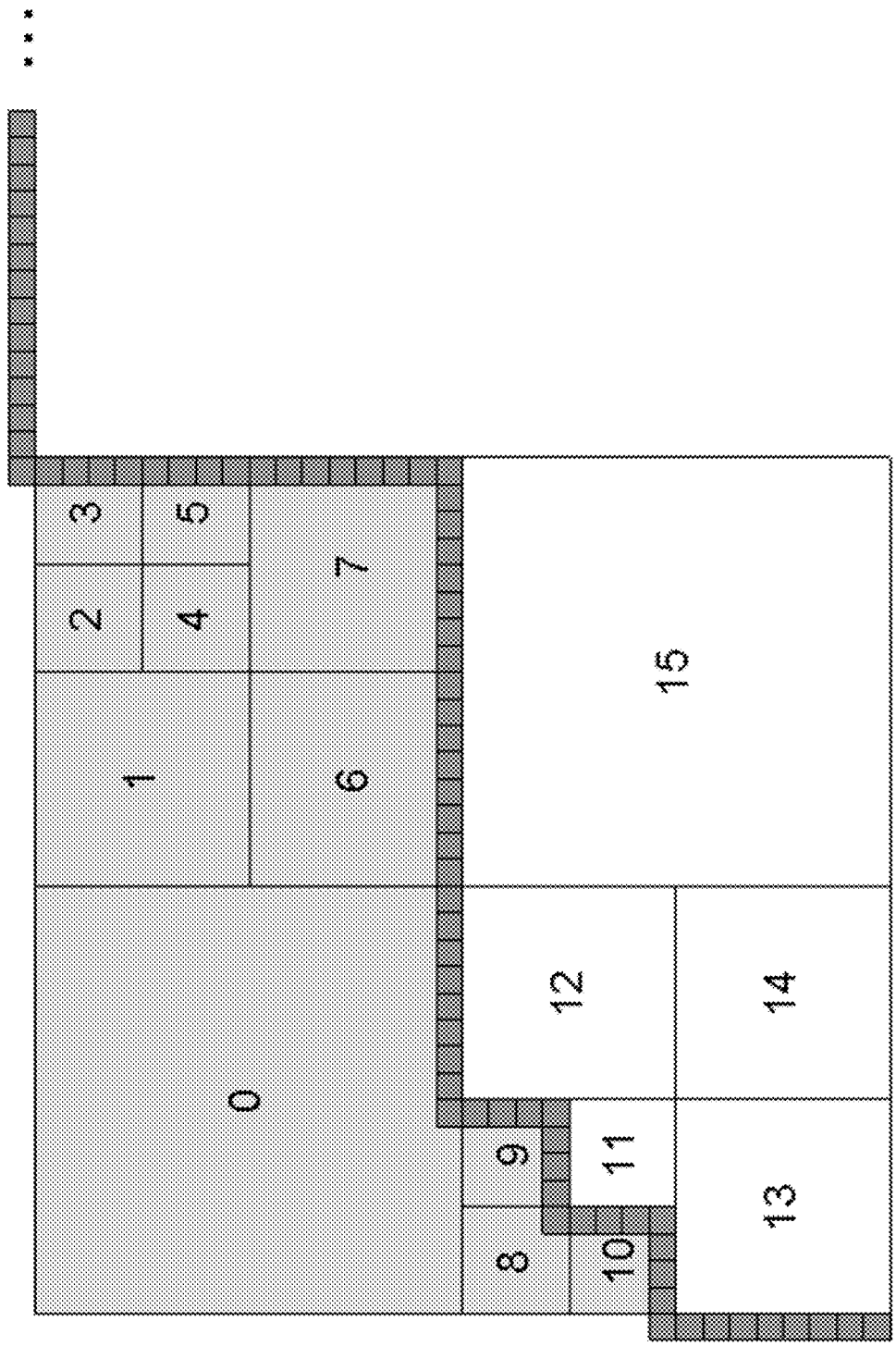

Because the CPMVs are only used for the affine motion data in heritance and the non-adjacent CPMVs can be disposed, in actual implementations the CPMVs do not need to be stored for the entire CTU. In order to minimize the storage requirements, a decoder can store only a top-row and left-column of vector context, rather than a full-CTU, or a full-picture worth of vector context, and as shown in FIGS. 9A and 9B. These figures illustrate the vector context state after decoding CU #10. The CPMV context is shown in FIG. 9A with 8-pixel granularity, and the standard sub-block MV context is shown in FIG. 9B with 4-pixel granularity. As each CU is decoded, the corresponding left and top context are updated, shifting the blue and green lines further down and to the right, working the way across the CTU and eventually across the picture.

In this type of memory-optimized implementation, the CPMVs would be stored for each 8-pixel segment. There would be 16 such segments for the top-row, 16 for the left-column, and 16 segments for storing top-left context. This CPMV storage would require roughly 24 bytes per segment (3 CPMVs—8 bytes each), so 1,152 bytes (24 bytes*48 segments) for the top/left CPMV context within the CTU. Additional such storage per 8-pixel segment would be required across the top of FIG. 9A (top line buffer) if affine inheritance was allowed to extend outside the current CTU.

The sub-block MVs would be stored for each 4-pixel segment. There would be 32 such segments for the top-row, 32 for the left-column, and 32 segments for storing top-left context. This MV storage would require roughly 8 bytes per segment (1 bi-directional MV—8 bytes each), so 768 bytes (8 bytes*96 segments) for the top/left sub-block MV context within the CTU.

This kind of memory-optimized implementation effectively cuts the memory footprint for the CPMVs from 6,144 bytes to 1,152 bytes for a 128×128 CTU. For the 64×64 block based decoder pipeline, the proposed cleanup avoids the need of buffering the CPMVs for the 64×64 blocks, which saves about 1,536 bytes memory (e.g., 6144/4 bytes). In addition, this implementation supports the motion vector reconstruction on a small block basis (e.g., 64×64 instead of 128×128), which further reduces the memory footprint for storage of the sub-block motion vectors from e.g. 8,192 bytes to 2,816 bytes (e.g., 8192/4+768).

9. Example of the Bandwidth Problem of Affine Motion Compensation

In some embodiments, since the current block is divided into 4×4 sub-blocks for luma component and 2×2 sub-blocks for the two chroma components to do the motion compensation, the total bandwidth requirement is much higher than non sub-block inter-prediction.

10. Exemplary Embodiments of Sub-Block Size

In some embodiments, a 4×4 block is used as the sub-block size for a uni-directional affine coded CU while 8×4/4×8 block is used as the sub-block size for a bi-directional affine coded CU.

11. Exemplary Embodiments of Affine Mode

For affine mode, sub-block motion vectors of an affine CU are constrained to be within a pre-defined motion vector field. Assume that the motion vectors of $1^{st}$ (top left) sub-block is $(v_{0x}, v_{0y})$ and the second sub-block is $(v_{1x}, v_{1y})$, values of $v_{1x}$ and $v_{1y}$ exhibit the following constraints:

$$v_{1x} \in [v_{0x}-H, v_{0x}+H]$$

$$v_{1y} \in [v_{0y}-V, v_{0y}+V]$$

Figure 10:
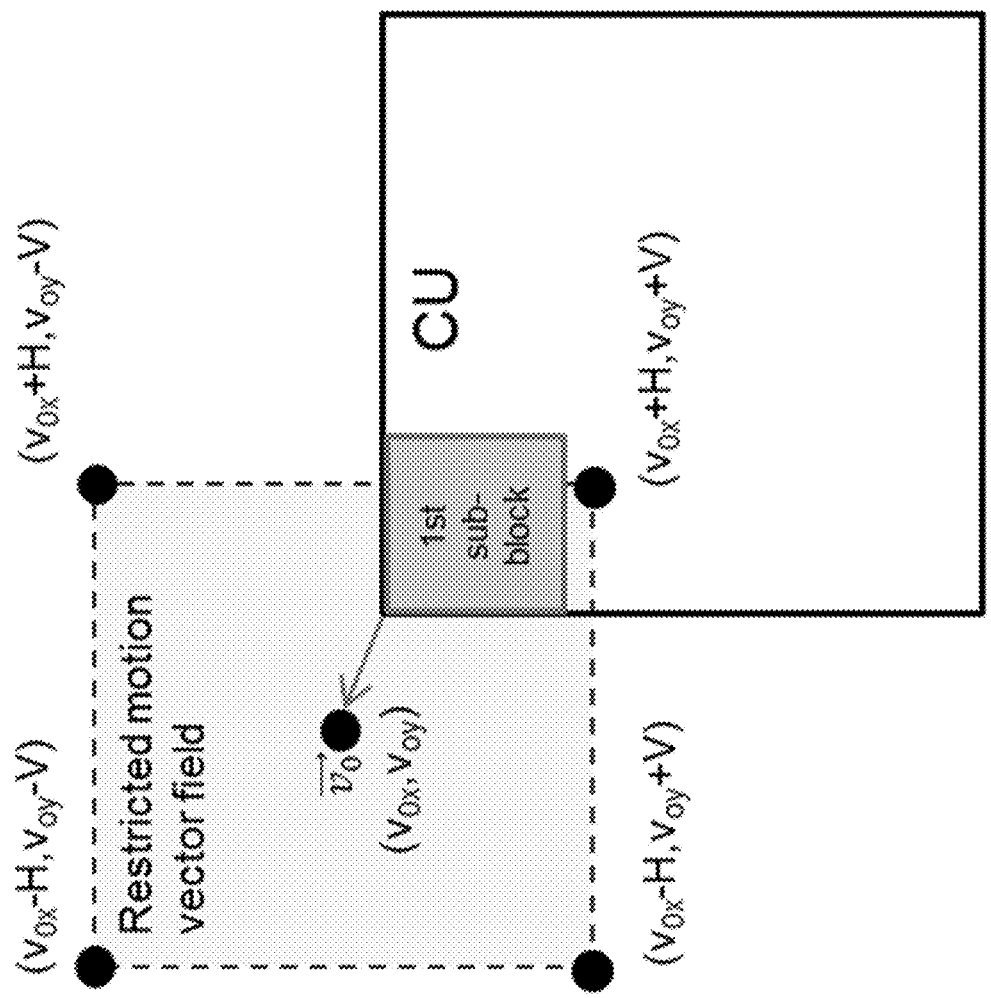
FIG. 10 shows an example of a constrained sub-block motion vector for a CU coded with an affine mode.

If the motion vector of any sub-block exceeds the pre-defined motion vector field, the motion vector is clipped. An illustration of the idea of constrained sub-block motion vector is shown in FIG. 10.

In some embodiments, and assuming memory is retrieved per CU instead of per sub-block, values H and V are chosen so that worst case memory bandwidth of affine CU will not exceed that of normal inter MC of a 8×8 bi-prediction block. Note that values of H and V are adaptive to CU size and uni-prediction or bi-prediction.

12. Exemplary Embodiments of Affine Mode

In some embodiments, and to reduce the memory bandwidth requirement in affine prediction, each 8×8 block within the block is regarded as the basic unit. The MVs of all four 4×4 sub-blocks inside the 8×8 block are constrained such that the max difference between integer parts of the four 4×4 sub-block MVs is no more than 1 pixel. So that the bandwidth is (8+7+1)*(8+7+1)/(8*8)=4 sample/pixel.

For example, after the MVs of all sub-blocks inside the current block are calculated with affine model, the MV of the sub-blocks containing the control points are firstly replaced with the corresponding control point MV. This means that, the MV of the top-left, top-right and bottom-left sub-blocks are replaced by the top-left, top-right and bottom-left control points MV, respectively. Then, for each 8×8 block within the current block, the MVs of all four 4×4 sub-blocks are clipped to guarantee the max difference between integer parts of the four MVs no more than 1 pixel. Here it should be noted that the sub-blocks containing the control points (top-left, top-right and bottom-left sub-blocks) use the corresponding control point MV to involve in the MV clipping process. During the clipping process, the MV of the top-right control point is kept un-changed.

The clipping process applied to each 8×8 block is described as follows:

(1) The minimal and maximal values for the MV components, MVminx, MVminy, MVmaxx, MVmaxy are determined first for each 8×8 block as follows:

(a) Get the minimal MV component among the four 4×4 sub-block MVs $MV\text{minx}=\min(MVx0, MVx1, MVx2, MVx3)$ $MV\text{miny}=\min(MVy0, MVy1, MVy2, MVy3)$ (b) Use the integer part of MVminx and MVminy as the minimal MV component, e.g., $MV\text{minx}=MV\text{minx}>>MV\_\text{precision}<<MV\_\text{precision}$ $MV\text{miny}=MV\text{miny}>>MV\_\text{precision}<<MV\_\text{precision}$ (c) The maximal MV component is calculated as follows:

$MV\text{maxx}=MV\text{minx}+(2<<MV\_\text{precision})-1$ $MV\text{maxy}=MV\text{miny}+(2<<MV\_\text{precision})-1$ (d) if the top-right control point is in current 8×8 block
if (MV1x>MVmaxx)

$MV\text{minx}=(MV1x>>MV\_\text{precision}<<MV\_\text{precision})-(1<<MV\_\text{precision})$ $MV\text{maxx}=MV\text{minx}+(2<<MV\_\text{precision})-1$ if (MV1y>MVmaxy)

$MV\text{miny}=(MV1y>>MV\_\text{precision}<<MV\_\text{precision})-(1<<MV\_\text{precision})$ $MV\text{maxy}=MV\text{miny}+(2<<MV\_\text{precision})-1$ (2) The MV components of each 4×4 block inside this 8×8 block are clipped as follows:

$MVxi=\max(MV\text{minx}, \min(MV\text{maxx}, MVxi))$ $MVyi=\max(MV\text{miny}, \min(MV\text{maxy}, MVyi))$ Herein, (MVxi, MVyi) is the MV of ith sub-block within one 8×8 block, where i is 0, 1, 2, 3; (MV1x, MV1y) is the MV of the top-right control point; MV_precision is equal to 4 corresponding to 1/16 motion vector fraction accuracy. Since the difference between integer parts of MVminx and MVmaxx (MVminy and MVmaxy) is 1 pixel, the max difference between integer parts of the four 4×4 sub-block MVs is no more than 1 pixel.

13. Exemplary Embodiments of Affine Mode

In some embodiments, there may be restrictions to the affine mode for the worst-case bandwidth reduction. To ensure that the worst-case bandwidth of the affine block is not worse than an INTER_4×8/INTER_8×4 block or even an INTER_9×9 block, the motion vector differences between affine control points are used to decide whether the subblock size of the affine block is 4×4 or 8×8.

13.1 General Affine Restriction for Worst-Case Bandwidth Reduction

The memory bandwidth reduction for the affine mode is controlled by restricting the motion vector difference between the affine control points (also named as the control points difference). In general, if the control points differences satisfy the restriction below, the affine motion is using 4×4 sub-blocks (namely 4×4 affine mode). Otherwise, it is using 8×8 sub-blocks (8×8 affine mode). The restrictions for the 6-parameters and 4-parameters model are given as follows.

To derive the constraints for different block sizes (w×h), the motion vector differences of the control points are normalized as:

$$\text{Norm}(v_{1x}-v_{0x})=(v_{1x}-v_{0x})*128/w$$

$$\text{Norm}(v_{1y}-v_{0y})=(v_{1x}-v_{0y})*128/w$$

$$\text{Norm}(v_{2x}-v_{0x})=(v_{2x}-v_{0x})*128/h$$

$$\text{Norm}(v_{2x}-v_{0x})=(v_{2x}-v_{0x})*128/h \quad \text{Eq. (8)}$$

In the 4-parameters affine model, $(v_{2x}-v_{0x})$ and $(v_{2y}-v_{0y})$ are set as the follows:

$$(v_{2x}-v_{0x})=-(v_{1y}-v_{0y})$$

$$(v_{2y}-v_{0y})=-(v_{1x}-v_{0x}) \quad \text{Eq. (9)}$$

Hence, the Norms of $(v_{2x}-v_{0x})$ and $(v_{2y}-v_{0y})$ are given as:

$$\text{Norm}(v_{2x}-v_{0x})=-\text{Norm}(v_{1y}-v_{0y})$$

$$\text{Norm}(v_{2y}-v_{0y})=\text{Norm}(v_{1x}-v_{0x}) \quad \text{Eq. (10)}$$

13.2 Restriction to Ensure Worst-Case Bandwidth for INTER_4×8 or INTER_8×4

$$|\text{Norm}(v_{1x}-v_{0x})+\text{Norm}(v_{2x}-v_{0x})+128|+|\text{Norm}(v_{1y}-v_{0y})+\text{Norm}(v_{2y}-v_{0y})+128|+|\text{Norm}(v_{1x}-v_0)-\text{Norm}(v_{2x}-v_{0x})|+|\text{Norm}(v_{1y}-v_{0y})-\text{Norm}(v_{2y}-v_{0y})|<128*3.25 \quad \text{Eq. (11)}$$

Herein, the left-hand side of the above equation represents the shrink or span level of the sub affine blocks while (3.25) indicates a 3.25 pixels shift.

13.3 Restriction to Ensure Worst-Case Bandwidth for INTER_9×9

$$(4*\text{Norm}(v_{1x}-v_0)>-4*\text{pel}\&\&+4*\text{Norm}(v_{1x}-v_{0x})<\text{pel}) \&\& (4*\text{Norm}(v_{2x}-v_{0x})>-\text{pel}\&\&4*\text{Norm}(v_{2x}-v_{0x})>\text{pel})\&\& (4*\text{Norm}(v_{2y}-v_{0y})>-4*\text{pel}\&\&4*\text{Norm}(v_{2y}-v_{0y})>\text{pel})\&\& ((4*\text{Norm}(v_{1x}-v_{0x})+4*\text{Norm}(v_{2x}-v_{0x})>-4*\text{pel})\&\& (4*\text{Norm}(v_{1x}-v_{0x})+4*\text{Norm}(v_{2x}-v_{0x})>\text{pel})\&\& ((4*\text{Norm}(v_{1y}-v_{0y})+4*\text{Norm}(v_{2y}-v_{0y})>-4*\text{pel}) \&\& (4*\text{Norm}(v_{1y}-v_{0y})+4*\text{Norm}(v_{2y}-v_{0y})>\text{pel}) \quad \text{Eq. (12)}$$

Herein, pel=128*16 (128 and 16 indicate the normalization factor and motion vector precision, respectively).

14. Drawbacks of Existing Methods for Combined Affine Merge Candidates

In some existing implementations, CPMVs are stored separately, therefore, additional memory is required.

In addition to the separately stored CPMVs, the width, height and the top-left position of a neighboring CU must be known to inherit the merge model from the neighboring affine coded CU. These pieces of side information will increase the line buffer size.

Other existing implementations that try to constrain the affine bandwidth impose additional computational burden at decoder.

15. Exemplary Methods for Representation of Affine Motion Data

Embodiments of the disclosed technology store the affine model parameters instead of storing the control point motion vectors (CPMVs), which address the bandwidth and line-buffer issues of affine prediction, and may improve video coding efficiency and enhance both existing and future video coding standards, is elucidated in the following examples described for various implementations. In the following examples, which should not be construed to be limiting, the coordinate of the top-left corner/top-right corner/bottom-left corner/bottom-right corner of the affine coded above or left neighboring CU are (LTNx, LTNy)/(RTNx, RTNy)/(LBNx, LBNy)/(RBNx, RBNy), respectively; the coordinate of the top-left corner/top-right corner/bottom-left corner/bottom-right corner of the current CU are (LTCx,LTCy)/(RTCx, RTCy)/(LBCx, LBCy)/(RBCx, RBCy), respectively; the width and height of the affine coded above or left neighboring CU are w' and h', respectively; the width and height of the affine coded current CU are w and h, respectively.

Furthermore, MV is 2-dimension vector noted as (MVx, MVy). MV1+MV2=MV3 means MV1x+MV2x=MV3x and MV1y+MV2y=MV3y. k×MV1=MV2 means k×MV1x=MV2x and k×MV1y=MV2y. Average(MV1, MV2)=((MV1x+MV2x)>>1, (MV1y+MV2y)>>1) or Average(MV1, MV2)=((MV1x+MV2x+1)>>1, (MV1y+MV2y+1)>>1).

In the examples that follow, SatShift(x,n) is defined as $$\text{SatShift}(x, n) = \begin{cases} (x + \text{offsset0}) \gg n & \text{if } x \geq 0 \\ -((-x + \text{offset1}) \gg n) & \text{if } x < 0 \end{cases}.$$

In one example, offset0 and offset1 are set to (1<<(n−1)).

In the examples that follow, Clip3(min, max, x) is defined as $$\text{Clip3(Min, Max, }x) = \begin{cases} \text{Min} & \text{if } x < \text{Min} \\ \text{Max} & \text{if } x > \text{Max} \\ x & \text{Otherwise} \end{cases}.$$

Although the following examples are described in the context of an "affine merge candidate list," the are equally applicable to other merge candidate lists, e.g. "sub-block merge candidate list" and when other kinds of sub-block merge candidate such as ATMVP candidate is also put into the merge candidate list.

Examples of Affine Motion Information to be Stored

Example 1. The parameters a, b, c, d, e and f defined in Eq. (2) may be stored for a block if it is coded with affine mode.

(a) Alternatively, a, b, c and d defined in Eq. (2) may be stored for a block if it is coded with affine mode. In this case, e and f are not stored any more.

(b) Alternatively, a and b defined in Eq. (1) are stored for a block if it is coded with the 4-parameter affine mode.

(c) Alternatively, a, b, e and f defined in Eq. (1) are stored for a block if it is coded with the 4-parameter affine mode.

(d) The parameters a, b, c, d, e and f defined in Eq. (2) are always stored for an affine coded block, but it is restricted that c=−b, d=a, if it is coded with 4-parameter affine mode.

(e) The parameters a, b, c and d defined in Eq. (2) are always stored for an affine coded block, but it is restricted that c=−b, d=a, if it is coded with 4-parameter affine mode.

(f) Which parameters to be stored may depend on the affine modes, inter or merge mode, block size, picture type, etc. al.

Example 2. In one example, the parameters to be stored can be calculated as below:

$$a=(mv_1^h-mv_0^h)/w \quad (a)$$

$$b=(mv_1^v-mv_0^v)/w \quad (b)$$

$$c=(mv_2^h-mv_0^h)/h \quad (c)$$

$$d=(mv_2^v-mv_0^v)/h \quad (d)$$

$$c=-b \text{ for 4-parameter affine prediction} \quad (e)$$

$$d=a \text{ for 4-parameter affine prediction} \quad (f)$$

$$e=mv_0^h \quad (g)$$

$$f=mv_\beta^v \quad (h)$$

$$(e,f)=(mvx,mvy), \text{ where } (mvx,mvy) \text{ can be any } MV. \quad (i)$$

Example 3. It is proposed to calculate affine model parameters without division operations. Suppose the width and height of the current block noted as w and h are equal to $2^{WB}$ and $2^{HB}$. P is an integer number defining the calculation precision, e.g., P is set to 7.

$$a=\text{SatShift}(P(mv_1^h-mv_0^h),WB) \quad (a)$$

$$b=\text{SatShift}(P(mv_1^v-mv_0^v),WB) \quad (b)$$

$$c=\text{SatShift}(P(mv_2^h-mv_0^h),WB) \quad (c)$$

$$d=\text{SatShift}(P(mv_2^v-mv_0^v),WB) \quad (d)$$

Example 4. The affine model parameters may be further clipped before being stored.

(a) In one example, suppose a parameter x (e.g. x=a or b or c or d) is stored with K bits, then x=Clip3($-2^{K-1}$, $2^{K-1}-1$, x).

(b) For example, a=Clip(−128, 127, a), then a is stored as a 8 bit signed integer.

Example 5. The affine model parameters may be stored for each M×N region. All sub-blocks (e.g., subM×subN sub-blocks) inside a M×N region share the same stored parameters.

(a) For example, M=N=4 or M=N=8, or M=N=16 or M=N=32, subM=subN=4.

(b) One of the sub-blocks within the region may be selected and its corresponding affine model parameters may be stored for the whole M×N region. Alternatively, the affine model parameters to be stored may be generated from affine model parameters of multiple sub-blocks.

(c) After encoding/decoding one tile/picture, the region size may be further adjusted wherein M'×N' region may be utilized to have the same affine model parameters and it could not happen that both M'=M and N'=N.

Figure 11:
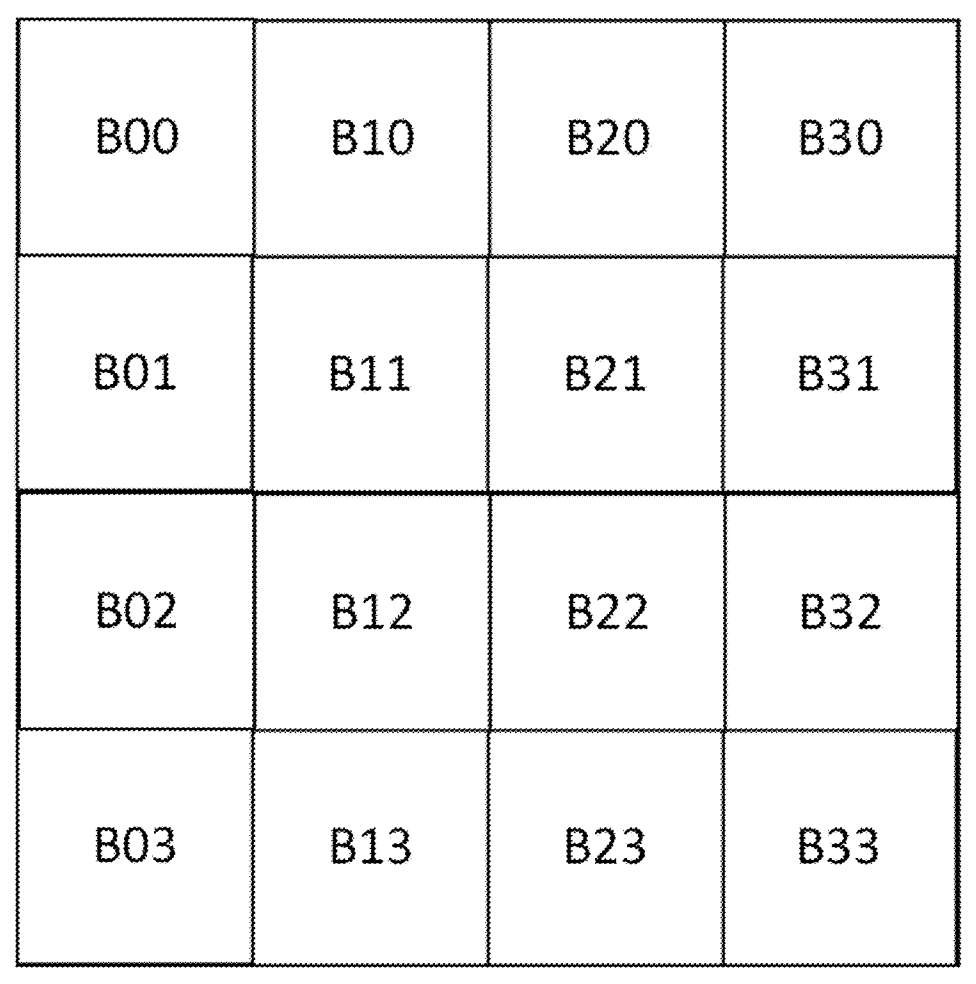

(d) In one example, the parameters stored in a region is set to be the parameters of a subM×subN block at the bottom-right corner of the region, e.g., B33 in FIG. 11.

(e) In one example, the parameters stored in a region is set to be the parameters of a subM×subN block at the bottom-left corner of the region, e.g., B03 in FIG. 11.

(f) In one example, the parameters stored in a region is set to be the parameters of a subM×subN block at the top-left corner of the region, e.g., B00 in FIG. 11.

(g) In one example, the parameters stored in a region is set to be the parameters of a subM×subN block at the top-right corner of the region, e.g., B30 in FIG. 11.

(h) In one example, the parameters stored in a region is set to be the parameters of a subM×subN block at the center of the region, e.g., B11 or B21 or B12 or B22 in FIG. 11.

(i) In one example, the parameters stored in a region is set to be the parameters of a subM×subN block at the middle of the bottom line of the region, e.g., B13 or B23 in FIG. 11.

(j) In one example, the parameters stored in a region is set to be the parameters of a subM×subN block at the middle of the left line of the region, e.g., B01 or B02 in FIG. 11.

(k) In one example, the parameters stored in a region is set to be the parameters of a subM×subN block at the middle of the right line of the region, e.g., B31 or B32 in FIG. 11.

(1) In one example, the parameters stored in a region is set to be the parameters of a subM×subN block at the middle of the top line of the region, e.g., B10 or B20 in FIG. 11.

Examples of Usage of Stored Affine Model Parameters

Example 6. The affine model parameters stored in a neighboring block may be used to derive the affine prediction of a current block.

(a) In one example, the parameters stored in neighboring blocks may be utilized for motion vector prediction or motion vector coding of current block.

(b) In one example, the parameters stored in a neighboring block may be used to derive the control point MVs (CPMVs) of the current affine-coded block.

(c) In one example, the parameters stored in a neighboring block may be used to derive the MVs used in motion compensation for sub-blocks of the current affine-coded block.

(d) In one example, the parameters stored in a neighbouring block may be used to derive the prediction for CPMVs of the current affine-coded block. This prediction for CPMVs can be used to predict the CPMVs of the current block when CPMVs need to be coded.

Example 7. The affine model parameters stored in a neighboring block may be inherited by the current block if the current block utilizes the affine merge mode merging from the neighboring block. Alternatively, the affine model of current block may be derived from affine model parameters stored in one or more neighboring blocks.

Example 8. The affine model parameters of the current block can be signaled from the encoder to the decoder.

(a) The parameters stored in neighboring blocks can be used to predict the parameters of the current block.

Example 9. The affine model parameters may be stored after coding/decoding a picture. The stored parameters can be used to predict the affine parameters of a block coded in another picture to be coded/decoded.

Example 10. The parameters for the two reference lists (List0 and List1) are both stored.

(a) In one example, the parameters for the two reference lists are stored independently.

(b) Alternatively, the parameters for the two reference lists can be stored with prediction from one to the other.

Example 11. It is proposed that affine model parameters for luma component may be stored also for chroma components. When coding the chroma components, the associated affine model parameters may be inherited or derived from those associated with luma component.

(a) Alternatively, affine model parameters for luma component may be stored and affine model parameters for two chroma components may be stored together or just stored for one chroma component or separately stored.

(b) In one example, whether to store separate affine model parameters for different color component may depend on the color format.

Examples of Temporal Prediction of Affine Model Parameters May be Utilized

Example 12. In one example, the stored affine model parameters of one or more blocks (e.g., a collocated block) in one or multiple pictures may be treated as the affine parameters of the current coding block with affine merge mode.

(a) In one example, the stored parameters of one or more blocks (e.g., a collocated block) in one or multiple pictures may be scaled (if necessary) before using as the affine parameters of the current coding block with affine merge mode.

(b) In one example, multiple temporal neighboring blocks may be checked in order to select one set of affine model parameters. For example, collocated block of the bottom-right neighboring 4×4/8×8 block of the CU, and collocated block of the center 4×4/8×8 block of the CU.

(c) In one example, temporal neighboring blocks may be identified by neighboring motion information.

(d) In one example, temporal neighboring blocks are from one so-called collocated picture. In one example, this collocated picture may be the same as that used in TMVP/ATMVP.

(e) In one example, the collocated picture may be signaled in VPS/SPS/PPS/slice header/tile group header.

(f) In one example, instead of inheriting or directly deriving from the temporal block, the associated affine model parameters of one or more blocks in different pictures may be used to predict the coding of affine model parameters of a current block, or predict the coding of CPMVs for a current block.

Example 13. The stored parameters of one or multiple blocks (e.g., collocated block) in one or more other pictures may be used as the prediction of the affine parameters of the current coding block with affine inter mode.

(a) In one example, the stored parameters of a collocated block in another picture may be scaled (if necessary) before using as the prediction of the affine parameters of the current coding block with affine inter mode.

(b) In one example, multiple temporal neighboring blocks may be checked. For example, collocated block of the bottom-right neighboring 4×4/8×8 block of the CU, and collocated block of the center 4×4/8×8 block of the CU.

(c) In one example, temporal neighboring blocks may be identified by neighboring motion information.

(d) In one example, the collocated picture may be the same as used in TMVP/ATMVP.

(e) In one example, the collocated picture may be signaled in VPS/SPS/PPS/slice header/tile group header.

Example 14. The motion information stored in a neighboring M×N unit block (e.g. 4×4 block in VTM) and the affine parameters stored in that unit block can be used together to derive the CPMVs or the MVs of sub-blocks used in motion compensation.

(a) Suppose the coordinate of the top-left position of the unit block is (x0, y0), then the coordinate of the center position of the unit block (xm, ym) can be calculated as:

$$xm=x0+M/2, ym=y0+N/2; \quad \text{(i)}$$

$$xm=x0+M/2-1, ym=y0+N/2-1; \quad \text{(ii)}$$

$$xm=x0+M/2-1, ym=y0+N/2; \quad \text{(iii)}$$

$$xm=x0+M/2, ym=y0+N/2-1; \quad \text{(iv)}$$

(b) Suppose the MV stored in the unit block is $(mv^h_0, mv^v_0)$, the coordinate of the position (x, y) for which the MV $(mv^h(x,y), mv^v(x,y))$ is derived. Suppose the coordinate of the top-left corner of the current block is (x0', y0'), the width and height of the current block is w and h, then (i) To derive a CPMV, (x, y) can be (x0', y0') or (x0'+w, y0') or (x0', y0'+h) or (x0'+w, y0'+h).

(ii) To derive a MV for a sub-block of the current block, (x, y) can be the center of the sub-block. Suppose (x00, y00) is the top-left position of a sub-block, the sub-block size is M×N, then $$xm=x00+M/2, ym=y00+N/2; \quad (1)$$

$$xm=x00+M/2-1, ym=y00+N/2-1; \quad (2)$$

$$xm=x00+M/2-1, ym=y00+N/2; \quad (3)$$

$$xm=x00+M/2, ym=y00+N/2-1; \quad (4)$$

(iii) In one example, $$\begin{cases} mv^h(x, y) = a(x - xm) - b(y - ym) + mv^h_0 \\ mv^v(x, y) = b(x - xm) + a(y - ym) + mv^v_0 \end{cases}$$

if the neighboring block is coded with the 4-parameter affine mode.

(iv) In one example, $$\begin{cases} mv^h(x, y) = ax + cy + mv^h_0 \\ mv^v(x, y) = bx + dy + mv^v_0 \end{cases}$$

if the neighboring block is coded with the 6-parameter affine mode.

(v) In one example, $$\begin{cases} mv^h(x, y) = ax + cy + mv^h_0 \\ mv^v(x, y) = bx + dy + mv^v_0 \end{cases}$$

regardless if the neighboring block is coded with the 4-parameter affine mode or the 6-parameter affine mode.

(c) In one example, CPMVs of the current block are derived from the motion vector and parameters stored in a neighboring block, and these CPMVs serves as MVPs for the signaled CPMVs of the current block.

(d) In one example, CPMVs of the current block are derived from the motion vector and parameters stored in a neighboring block, and these CPMVs are used to derive the MVs of each sub-block used for motion compensation.

(e) In one example, the MVs of each sub-block used for motion compensation are derived from the motion vector and parameters stored in a neighboring block, if the current block is affine merge coded.

Example 15. Pruning of affine model parameters from multiple neighboring blocks (spatial and/or temporal neighboring blocks) may be applied before being used for affine model parameter inheritance/derivation/prediction.

(a) The affine model parameters of different neighboring blocks can be compared to decide whether the parameters from one neighboring block are not same or similar to the parameters from another neighboring blocks already in the affine merge or affine AMVP candidate list, and the parameters from the neighboring block should be put into the candidate list. Suppose {a, b, c, d, e, f} are parameters from of a neighboring block and {a', b', c', d', e', f'} are parameters from of a neighboring block. The affine model with parameters {a, b, c, d, e, f} is considered redundant and not put into the candidate list when the affine model with parameters {a', b', c', d', e', f'} is already in the candidate list if and only if:

(b) a==a' in one example.
(c) b==b' in one example.
(d) c==c' in one example.
(e) d==d' in one example.
(f) a==a' and b==b' in one example.
(g) c==c' and d==d' in one example.
(h) a==a' and b==b' and c==c' in one example.
(i) a==a' and b==b' and c==c' and d==d' in one example.

Example 16. Whether to and how to apply the proposed methods may depend on the position of the current block and neighboring blocks.

(a) In one example, the one or multiple of proposed methods may only be applied if the current block is at the bottom in a CTU, or at the bottom in a M×N region (e.g. M=N=64).

(b) In one example, the one or multiple of proposed methods may only be applied if the current block is at the top in a CTU, or at the top in a M×N region (e.g. M=N=64).

(c) In one example, the one or multiple of proposed methods may only be applied if the current block is at the left in a CTU, or at the left in a M×N region (e.g. M=N=64).

(d) In one example, the one or multiple of proposed methods may only be applied if the current block is at the right in a CTU, or at the right in a M×N region (e.g. M=N=64).

The examples described above may be incorporated in the context of the methods described below, e.g., method 1200, which may be implemented at a video decoder/encoder.

Figure 12:
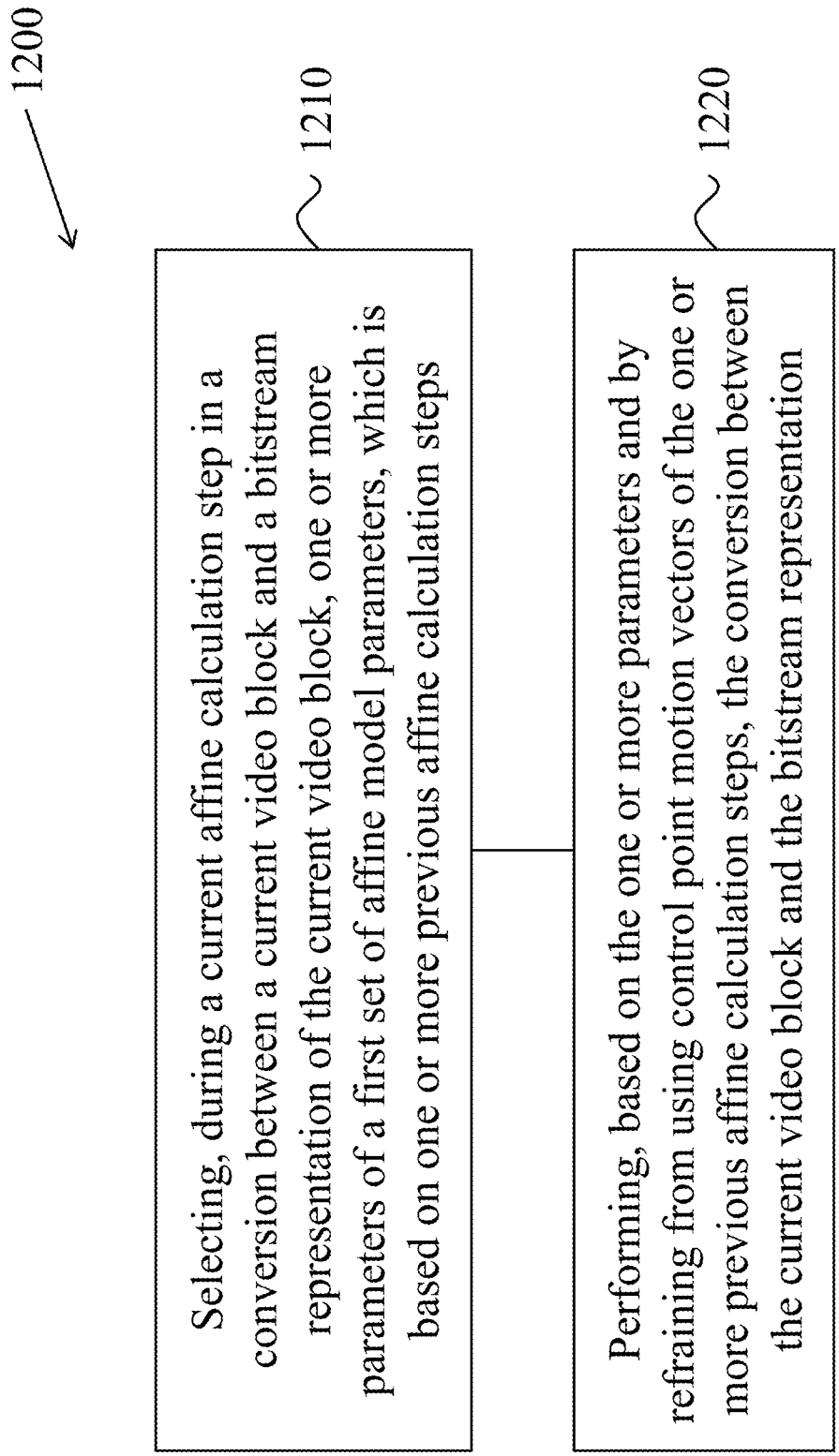
FIG. 12 shows a flowchart of an example method for video coding in accordance with the disclosed technology.

FIG. 12 shows a flowchart of an exemplary method for video coding. The method 1200 includes, at step 1210, selecting, during a current affine calculation step in a conversion between a current video block and a bitstream representation of the current video block, one or more parameters of a first set of affine model parameters, where the first set of affine model parameters is based on one or more previous affine calculation steps.

In some embodiments, and in the context of Example 1, the first set of affine model parameters comprises six variables (a, b, c, d, e, f) corresponding to a six-parameter affine model defined in Eq. (1). In an example, the one or more parameters comprise (a, b, c, d, e, f). In another example, the one or more parameters comprise (a, b, c, d).

In some embodiments, and in the context of Example 1, the first set of affine model parameters comprises four variables (a, b, e, f) corresponding to a four-parameter affine model defined in Eq. (2). In one example, the one or more parameters comprise (a, b, e, f). In another example, the one or more parameters comprise (a, b).

In some embodiments, and in the context of Example 11, the current video block comprises a luma component and a chroma component, and the first set of affine model parameters are associated with both the luma component and the chroma component.

In some embodiments, and in the context of Example 12, the first set of affine model parameters are associated with one or more collocated blocks. In other embodiments, the first set of affine model parameters are associated with one temporal neighboring block of a plurality of temporal neighboring blocks. For example, the one temporal neighboring block is identified based on neighboring motion information. For example, the one temporal neighboring block is from a collocated picture. For example, TMVP or ATMVP for the current video block is based on the collocated picture. For example, the collocated picture is signaled in a video parameter set (VPS), a sequence parameter set (SPS), a picture parameter set (PPS), a slice header or a tile group header.

In some embodiments, and in the context of Example 14, the first set of affine model parameters are associated with a neighboring M×N unit block, and performing the conversion is further based on motion information corresponding to the neighboring M×N unit block. Furthermore, the method 1200 further includes the step of deriving, for motion compensation, CPMVs or motion vectors of sub-blocks of the current video block.

The method 1200 includes, at step 1220, performing, based on the one or more parameters and by refraining from using control point motion vectors (CPMVs) of the one or more previous affine calculation steps, the conversion between the current video block and the bitstream representation. In some embodiments, the conversion generates the current block from the bitstream representation (e.g., as might be implemented in a video decoder). In other embodiments, the conversion generates the bitstream representation from the current block (e.g., as might be implemented in a video encoder).

In some embodiments, and in the context of Example 6, the first set of affine model parameters are associated with a neighboring block of the current video block. In an example, performing the conversion comprises motion vector prediction or motion vector coding of the current video block. In another example, performing the conversion comprises deriving one or more CPMVs of the current video block. In yet another example, performing the conversion comprises deriving one or more motion vectors for motion compensation for sub-blocks of the current video block. In another example, performing the conversion comprises deriving a prediction for one or more CPMVs of the current video block.

In some embodiments, and in the context of Example 10, the first set of affine model parameters are associated with a first reference list, and performing the conversion is further based on one or more parameters of a second set of affine model parameters that are associated with a second reference list.

In some embodiments, and in the context of Example 13, the method 1200 further includes the step of scaling, prior to the performing the conversion, the one or more parameters of the first set of affine model parameters.

In some embodiments, and in the context of Example 4, the method 1200 further includes the step of clipping, prior to the performing the conversion, the one or more parameters of the first set of affine model parameters.

In some embodiments, and in the context of Example 15, the method 1200 further includes the step of pruning, prior to the performing the conversion, a plurality of sets of affine model parameters associated with the plurality of temporal neighboring blocks.

In some embodiments, and in the context of Example 16, performing the conversion is further based on a position of the current video block.

16. Example Implementations of the Disclosed Technology

Figure 13:
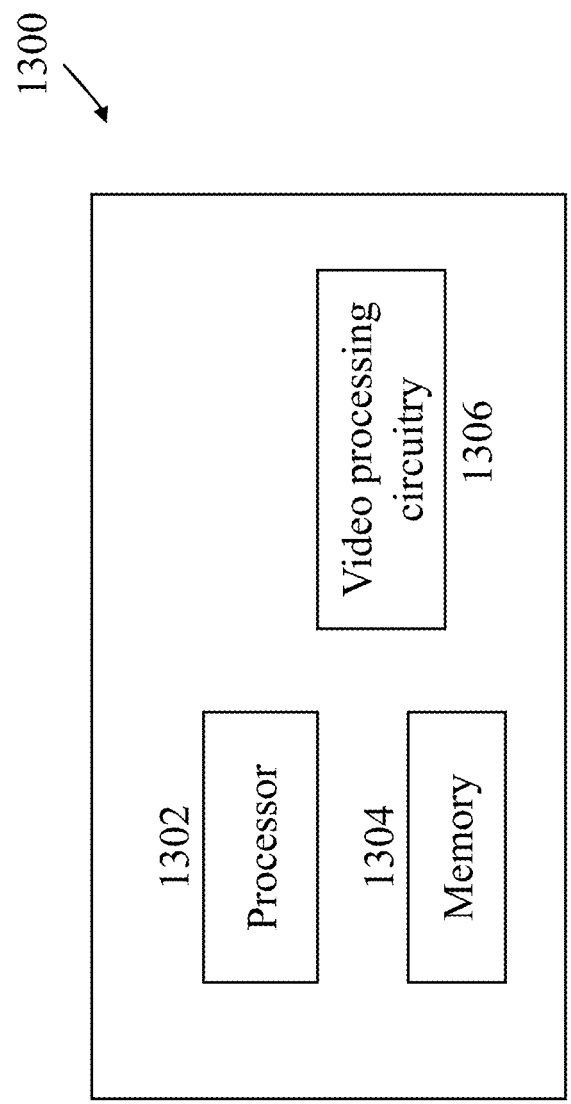
FIG. 13 is a block diagram of an example of a hardware platform for implementing a visual media decoding or a visual media encoding technique described in the present document.

FIG. 13 is a block diagram of a video processing apparatus 1300. The apparatus 1300 may be used to implement one or more of the methods described herein. The apparatus 1300 may be embodied in a smartphone, tablet, computer, Internet of Things (IoT) receiver, and so on. The apparatus 1300 may include one or more processors 1302, one or more memories 1304 and video processing hardware 1306. The processor(s) 1302 may be configured to implement one or more methods (including, but not limited to, method 1200) described in the present document. The memory (memories) 1304 may be used for storing data and code used for implementing the methods and techniques described herein. The video processing hardware 1306 may be used to implement, in hardware circuitry, some techniques described in the present document.

Figure 14:
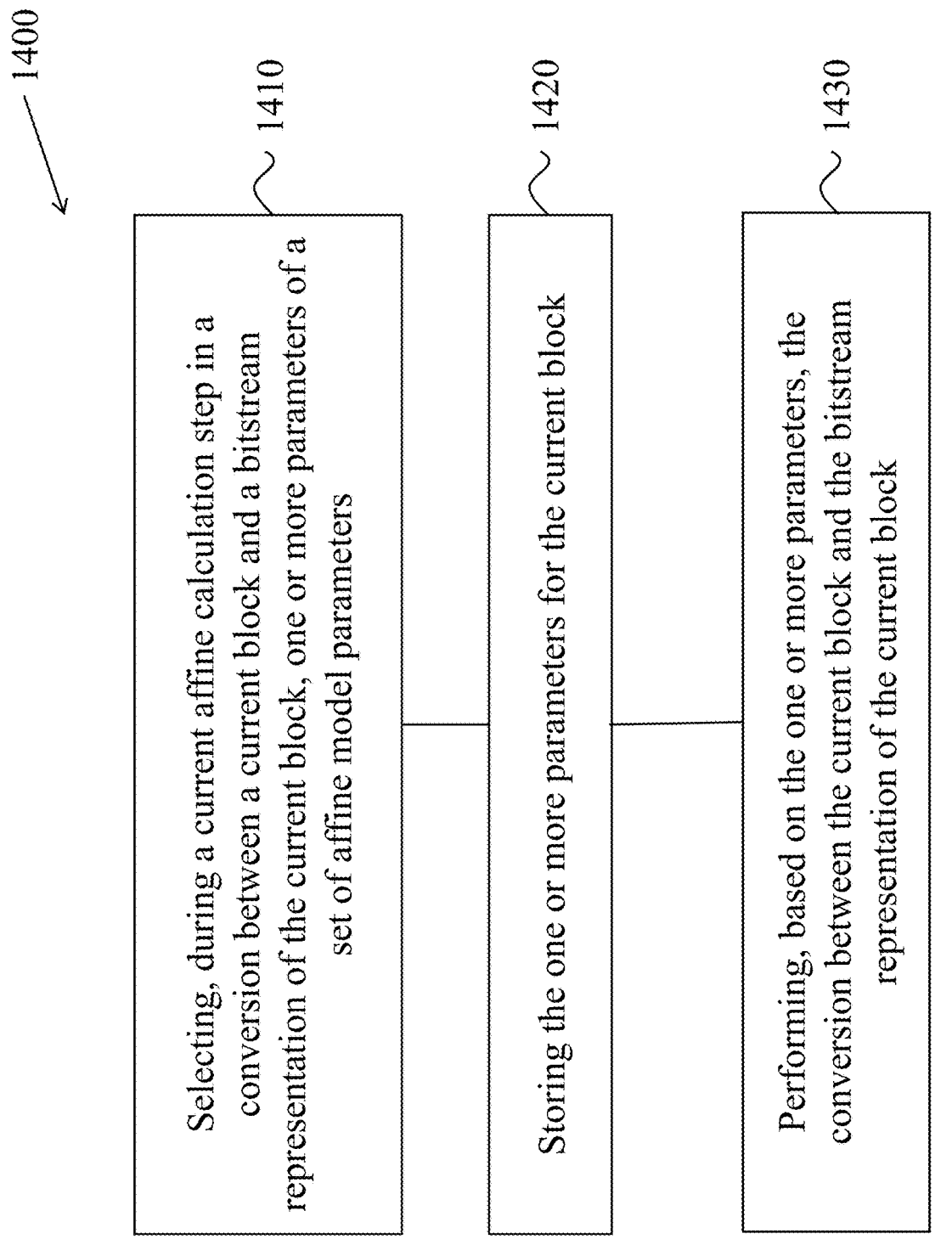
FIG. 14 is a flowchart of an example method for video processing in accordance with the disclosed technology.

FIG. 14 shows a flowchart of an exemplary method for video coding. The method 1400 includes, at step 1410, selecting, during a current affine calculation step in a conversion between a current block and a bitstream representation of the current block, one or more parameters of a set of affine model parameters; at step 1420, storing the one or more parameters for the current block; and at step 1430, performing, based on the one or more parameters, the conversion between the current block and the bitstream representation of the current block.

Figure 15:
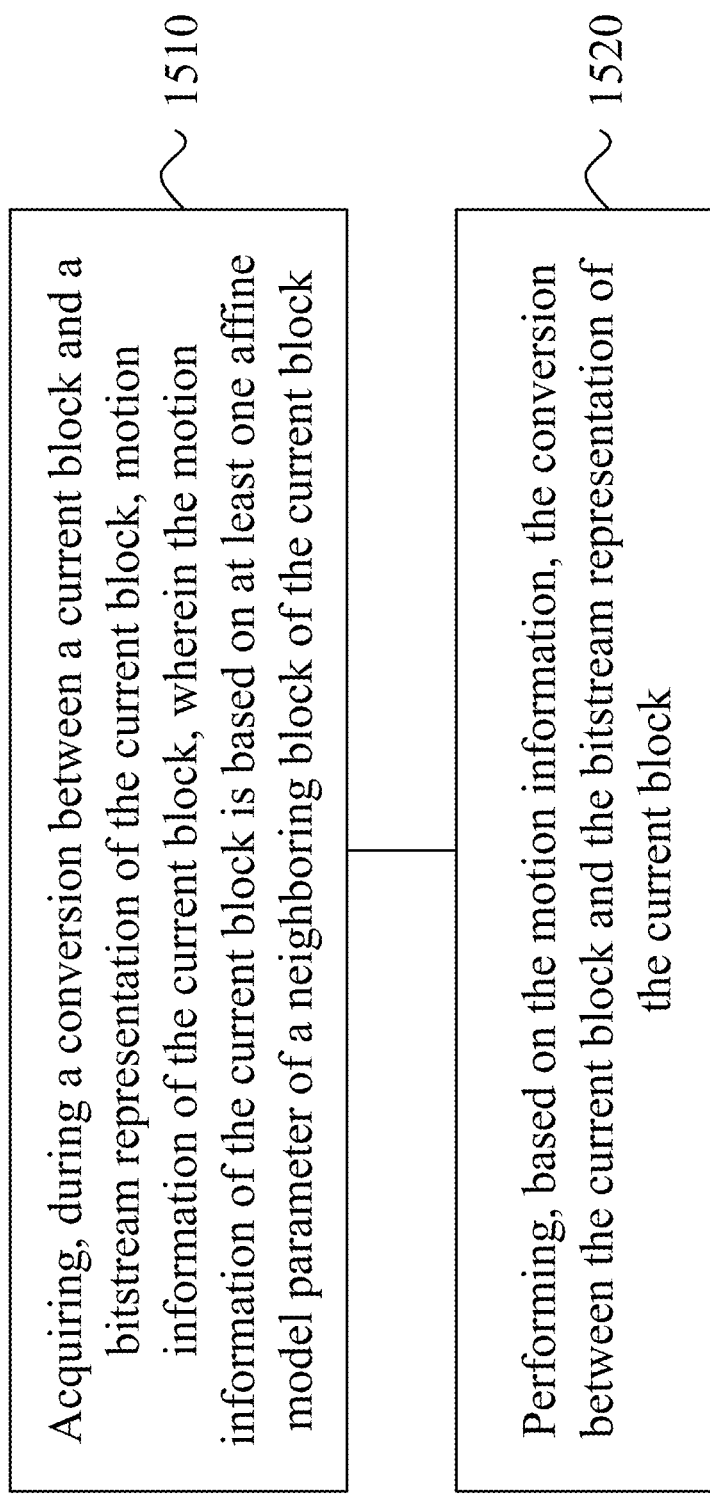
FIG. 15 is a flowchart of another example method for video processing in accordance with the disclosed technology.

FIG. 15 shows a flowchart of another exemplary method for video coding. The method 1500 includes, at step 1510, acquiring, during a conversion between a current block and a bitstream representation of the current block, motion information of the current block, wherein the motion information of the current block is based on at least one affine model parameter of a neighboring block of the current block; and at step 1520, performing, based on the motion information, the conversion between the current block and the bitstream representation of the current block.

In the present document, the term "video processing" may refer to video encoding, video decoding, video compression or video decompression. For example, video compression algorithms may be applied during conversion from pixel representation of a video to a corresponding bitstream representation or vice versa.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
selecting, during a current affine calculation step in a conversion between a current block and a bitstream of the current block, one or more parameters of a set of affine model parameters;
clipping the one or more parameters,
wherein, when one of the one or more parameters, X, is stored with K bits, then X is clipped to Clip3($-2^{K-1}$, $2^{K-1}-1$, X), and wherein K is an integer greater than one;
storing, subsequent to the clipping, the one or more parameters for the current block; and
performing, based on the one or more parameters, the conversion between the current block and the bitstream of the current block,
wherein the one or more parameters are selected depending on at least one of: an inter mode, a merge mode, a block size, or a picture type.

2. The method of claim 1, wherein the conversion includes decoding the current block from the bitstream.

3. The method of claim 1, wherein the conversion includes encoding the current block into the bitstream.

4. The method of claim 1, wherein a parameter a of the set of affine model parameters is calculated by $$a = \frac{(mv_1^h - mv_0^h)}{w},$$

where $mv_0^h$ is a horizontal motion vector component of a top-left corner control point of the current block, $mv_1^h$ is a horizontal motion vector component of a top-right corner control point of the current block, and w is width of the current block.

5. The method of claim 1, wherein a parameter b of the set of affine model parameters is calculated by $$b = \frac{(mv_1^h - mv_0^h)}{w},$$

where $mv_0^v$ is a vertical motion vector component of a top-left corner control point of the current block, $mv_1^v$ is a vertical motion vector component of a top-right corner control point of the current block, and w is width of the current block.

6. The method of claim 1, wherein a parameter c of the set of affine model parameters is calculated by $$c = \frac{(mv_2^h - mv_0^h)}{h}$$

where $mv_0^h$ is a horizontal motion vector component of a top-left corner control point of the current block, $mv_2^h$ is a horizontal motion vector component of a bottom-left corner control point of the current block, and h is height of the current block.

7. The method of claim 1, wherein a parameter d of the set of affine model parameters is calculated by $$d = \frac{(mv_2^v - mv_0^v)}{h}$$

where $mv_0^v$ is a vertical motion vector component of a top-left corner control point of the current block, $mv_2^v$ is a vertical motion vector component of a bottom-left corner control point of the current block, and h is height of the current block.

8. The method of claim 1, wherein a parameter e of the set of affine model parameters is calculated by e=$mv_0^h$, where $mv_0^h$ is a horizontal motion vector component of a top-left corner control point of the current block.

9. The method of claim 1, wherein a parameter f of the set of affine model parameters is calculated by f=$mv_0^v$, where $mv_0^v$ is a vertical motion vector component of a top-left corner control point of the current block.

10. The method of claim 1, wherein parameters e and f of the set of affine model parameters are calculated by (e, f)=($mv_{xi}$, $mv_{yi}$), where ($mv_{xi}$, $mv_{yi}$) is a motion vector of any point.

11. The method of claim 1, wherein the set of affine model parameters comprises six variables (a, b, c, d, e, f) corresponding to a six-parameter affine model given by $$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases}$$

where $mv^h(x,y)$ is a horizontal component of a motion vector of the current block, $mv^v(x,y)$ is a vertical component of a motion vector of the current block, and (x,y) represents a coordinate of a representative point relative to a top-left sample within the current block; ($mv_0^h$, $mv_0^v$) is a motion vector of a top-left corner control point (CP), and ($mv_1^h$, $mv_1^v$) is a motion vector of a top-right corner control point and ($mv_2^h$, $mv_2^v$) is a motion vector of a bottom-left corner control point for the current block.

12. The method of claim 1, wherein the set of affine model parameters comprises four variables (a, b, e, f) corresponding to a four-parameter affine model given by $$\begin{cases} mv^h(x, y) = ax - by + e = \dfrac{(mv_1^h - mv_0^h)}{w}x - \dfrac{(mv_1^v - mv_0^v)}{w}y + mv_0^h \\ mv^v(x, y) = bx + ay + f = \dfrac{(mv_1^v - mv_0^v)}{w}x + \dfrac{(mv_1^h - mv_0^h)}{w}y + mv_0^v \end{cases}$$

where $mv^h(x,y)$ is a horizontal component of a motion vector of the current block, $mv^v(x,y)$ is a vertical component of a motion vector of the current block, and (x,y) represents a coordinate of a representative point relative to a top-left sample within the current block; $(mv^h_0, m^{hv}_0)$ is a motion vector of a top-left corner control point (CP), and $(mv^h_1, mv^v_1)$ is a motion vector of a top-right corner control point for the current block.

13. The method of claim 12, wherein the one or more parameters comprise a, b, e and f.

14. The method of claim 11, wherein the one or more parameters comprise a, b, c, d, e and f, and wherein it is restricted that c=−b and d=a, when the conversion between the current block and the bitstream of the current block is performed with a four-parameter affine mode.

15. The method of claim 11, wherein the one or more parameters comprise a, b, c and d, and wherein it is restricted that c=−b and d=a, when the conversion between the current block and the bitstream of the current block is performed with a four-parameter affine mode.

16. The method of claim 1, wherein for a region with a size of M×N, which includes sub-blocks with dimensions subM×subN, each of the sub-blocks share same one or more parameters stored for the region, where M, N, subM and subN are integers greater than one.

17. The method of claim 16, wherein one sub-block of the sub-blocks is selected, and the one or more parameters stored for the region are based on the set of affine model parameters of the one sub-block that was selected or based on the set of affine model parameters of selected multiple sub-blocks.

18. An apparatus for processing video data comprising a processor and a non-transitory memory with instructions thereon, wherein the instructions upon execution by the processor, cause the processor to:
select, during a current affine calculation step in a conversion between a current block and a bitstream of the current block, one or more parameters of a set of affine model parameters;
clip the one or more parameters,
wherein, when one of the one or more parameters, X, is stored with K bits, then X is clipped to Clip3($-2^{K-1}$, $2^{K-1}-1$, X), and wherein K is an integer greater than one;
store, subsequent to clipping, the one or more parameters for the current block; and
perform, based on the one or more parameters, the conversion between the current block and the bitstream of the current block,
where in the one or more parameters are selected depending on at least one of: an inter mode, a merge mode, a block size, or a picture type.

19. A non-transitory computer-readable recording medium storing a bitstream of a video which is generated by a method performed by a video processing apparatus, wherein the method comprises:
selecting, during a current affine calculation step in a conversion between a current block and a bitstream of the current block, one or more parameters of a set of affine model parameters;
clipping the one or more parameters,
wherein, when one of the one or more parameters, X, is stored with K bits, then X is clipped to Clip3($-2^{K-1}$, $2^{K-1}-1$, X), and wherein K is an integer greater than one;
storing, subsequent to the clipping, the one or more parameters for the current block; and
generating the bitstream based on the one or more parameters,
where in the one or more parameters are selected depending on at least one of: an inter mode, a merge mode, a block size, or a picture type.

20. The apparatus of claim 18, wherein for a region with a size of M×N, which includes sub-blocks with dimensions subM×subN, each of the sub-blocks share same one or more parameters stored for the region, where M, N, subM and subN are integers greater than one, and wherein one sub-block of the sub-blocks is selected, and the one or more parameters stored for the region are based on the set of affine model parameters of the one sub-block that was selected or based on the set of affine model parameters of selected multiple sub-blocks.

* * * * *